(12) United States Patent
Okishiro et al.

(10) Patent No.: US 7,940,354 B2
(45) Date of Patent: May 10, 2011

(54) LIQUID CRYSTAL DISPLAY DEVICE

(75) Inventors: Kenji Okishiro, Kodaira (JP); Masatoshi Shiiki, Musashimurayama (JP)

(73) Assignees: Hitachi Displays, Ltd., Chiba (JP); Hitachi Display Devices, Ltd., Chiba (JP)

( * ) Notice: Subject to any disclaimer, the term of this patent is extended or adjusted under 35 U.S.C. 154(b) by 1108 days.

(21) Appl. No.: 11/340,640

(22) Filed: Jan. 27, 2006

(65) Prior Publication Data

US 2006/0170325 A1 Aug. 3, 2006

(30) Foreign Application Priority Data

Jan. 28, 2005 (JP) ................................. 2005-021725

(51) Int. Cl.
*G02F 1/1335* (2006.01)
(52) U.S. Cl. .......................................... 349/70; 349/69
(58) Field of Classification Search .................. None
See application file for complete search history.

(56) References Cited

U.S. PATENT DOCUMENTS

| | | | | |
|---|---|---|---|---|
| 4,085,350 | A * | 4/1978 | Kagami et al. | 313/486 |
| 4,345,249 | A | 8/1982 | Togashi | |
| 4,424,467 | A * | 1/1984 | Masuda et al. | 313/467 |
| 6,177,973 | B1 * | 1/2001 | Lee et al. | 349/123 |
| 6,249,328 | B1 * | 6/2001 | Fukuzawa et al. | 349/70 |
| 6,337,539 | B1 * | 1/2002 | Yorifuji et al. | 315/56 |
| 6,727,649 | B1 * | 4/2004 | Yano et al. | 313/607 |
| 6,821,691 | B2 * | 11/2004 | Machiguchi et al. | 430/7 |
| 2004/0144955 | A1 * | 7/2004 | Chau | 252/301.4 R |

FOREIGN PATENT DOCUMENTS

| | | |
|---|---|---|
| JP | 62-172085 A | 7/1987 |
| JP | 7-94658 B2 | 10/1995 |
| JP | 11-73138 A | 3/1999 |
| JP | 11-144625 A | 5/1999 |
| JP | 2002-313282 A | 10/2002 |
| JP | 2003-121838 A | 4/2003 |
| JP | 2003-193047 A | 7/2003 |

OTHER PUBLICATIONS

"Principles and Characteristics of Electro-Optical Behaviour with In-Plane Switching Mode" by Oh-e, et al. Asia Display'95. pp. 577-579.

* cited by examiner

*Primary Examiner* — David Nelms
*Assistant Examiner* — Lucy P Chien
(74) *Attorney, Agent, or Firm* — Mattingly & Malur, PC

(57) ABSTRACT

A liquid crystal display device by the use of such a high quality light source in order to suppress brightness distribution and chromaticity distribution of a light source. The liquid crystal display device comprises a white light source provided with a blue phosphor that emits blue light, a green phosphor that emits green light, and a red phosphor that emits red light and a liquid crystal display panel having color filters to adjust the amount of transmitted light from the white light source for every pixel and transmit any one of blue, green, and red lights for every pixel, where the red phosphor to be used is represented by a composition formula $(Y_{1-x-y}Gd_xEu_y)_2O_3$. At this time, it is desirable that the conditions of $0.45 \leq x \leq 0.85$ and $0.025 \leq y \leq 0.040$ respectively are satisfied.

12 Claims, 15 Drawing Sheets

LIQUID CRYSTAL DISPLAY DEVICE

CLAIM OF PRIORITY

The present application claims priority from Japanese application JP 2005-021725 filed on Jan. 28, 2005, the content of which is hereby incorporated by reference into this application.

FIELD OF THE INVENTION

The present invention relates to a liquid crystal display device, and more particularly to a white light source provided with a red phosphor having small changes in brightness due to temperature and a liquid crystal display device with the use thereof.

BACKGROUND OF THE INVENTION

A liquid crystal display device includes a back light unit 1 and a liquid crystal display panel 2 as shown in an exploded cross sectional view of FIG. 10. Further, the back light unit includes a white light source 5, a driving circuit 9 (inverter) to light up the white light source, a housing 3, a reflector 4, a diffuser plate 6, a prism sheet 7, and a reflective polarizer 8.

In the liquid crystal display device, color display is performed by guiding light from this white light source 5 to the liquid crystal display panel side via the back light unit 1, adjusting the amount of transmitted light for every pixel on the liquid crystal display panel 2, and separating the light into any one of red, green, and blue lights for every pixel to transmit.

Generally, for the white light source 5 of the liquid crystal display device, a cold cathode fluorescent lamp (CCFL) is used. FIG. 11 shows a cross sectional diagram of CCFL in the longitudinal direction. As shown in the figure, CCFL has a structure in which the inner wall of a glass tube 11 is coated with a phosphor 12 and both ends of the tube are provided with electrodes 13. Further, mercury and a rare gas (argon or neon) are sealed in the tube as a discharge medium 14.

CCFL for use in this kind of back light has a very long and narrow characteristic shape that is different from, for example, a fluorescent lamp for interior illumination, and in the case of a 32-inch liquid crystal display device, the diameter of the tube is ca. 4 mm and its length is ca. 720 mm.

Illumination of this CCFL is carried out by applying high voltage to the electrodes on both ends as is known. Electrons released from the electrode by applying voltage excite mercury, and the excited mercury radiates ultraviolet light when returning to the ground state. The phosphor is excited by this ultraviolet light to radiate visible light to the outside of the tube.

The phosphor 12 provided in CCFL is formed by mixing powders of a blue phosphor that emits blue light (main emission peak wavelength of approximately from 400 to 500 nm), a green phosphor that emits green light (main emission peak wavelength of approximately from 500 to 600 nm), and a red phosphor that emits red light (main emission peak wavelength of approximately from 600 to 650 nm) in a certain weight ratio so as to give a predetermined white color.

Typically, a blue phosphor $BaMgAl_{10}O_{17}:Eu^{2+}$, a green phosphor $LaPO_4:Tb^{3+},Ce^{3+}$, and a red phosphor $Y_2O_3:Eu^{3+}$ are used. According to the common notation for phosphor material, the front of ":" mark represents a host material composition while its back represents a luminescence center, implying that part of atoms in the host material is replaced by the luminescence center. For example, in the red phosphor $Y_2O_3:Eu^{3+}$, $Y_2O_3$ is the host material, and part of yttrium (Y) is replaced by europium (Eu). Hence, $Y_2O_3:Eu^{3+}$ may be represented by $(Y,Eu)_2O_3$.

The visible light radiated from CCFL passes through the diffuser plate 6, the prism sheet 7, and the reflective polarizer 8 that are arranged directly on CCFL and enters into the liquid crystal display panel 2 as shown in FIG. 2. To enhance the efficiency of utilization of light from CCFL, the reflector 4 is placed on the backside of CCFL, and the light reflected from this also enters into the liquid crystal display panel 2.

On the other hand, the liquid crystal display panel 2 has a cross sectional structure shown in FIG. 16. That is, a pair of glass substrates 21 (21A and 21B) opposite to each other are arranged, alignment layers 23 are coated on the inner surfaces of the substrates, and a liquid crystal 24 and color filters 25 (red color 25A, green color 25B, and blue color 25C) are sandwiched between the substrates.

The glass substrates (21A and 21B) are held by spacers 26 placed therebetween. Polarizing plates 22 (22A and 22B) are placed on the outer surfaces of the substrates 21. The liquid crystal 24 is in a uniform alignment state by the alignment layers 23 and driven by applying voltage to a group of electrodes formed for every pixel (not shown in FIG. 16). When voltage is applied, the liquid crystal rotates in response to an electric field generated by the voltage, thereby bringing about a change in the refractive index of the liquid crystal layer to adjust the amount of transmitted light. The color filters 25 separate white light W from a back light unit into red light R, green light G, and blue light B for every pixel and transmit any one of the color lights.

There are various display modes depending on initial alignment of liquid crystal and driving thereof. Typical display modes include in-plane switching (IPS) mode, vertically aligned (VA) mode, optically compensated bend (OCB) mode, and twisted nematic (TN) mode.

In this way, the color display of the liquid crystal display device is performed by adjusting the amount of transmitted light from the white light source 5 provided in the back light unit for every pixel as well as separating the light by the color filters 25 that transmit any one of red, green, and blue lights for every pixel on the liquid crystal display panel 2. It should be noted that this type of related art includes, for example, Patent Document 1; U.S. Pat. No. 4,345,249 and Non-patent Document 1; IDRC'95 (Asia Display 95), p. 577 (1995).

SUMMARY OF THE INVENTION

Recently, market of liquid crystal display device is expanding with major demand in liquid crystal television, and further high image quality is being sought. Particularly, in accordance with rapid upsizing of liquid crystal television screen, serious problems of distributions of brightness and chromaticity on the surface of the display screen are arising. One cause of these surface distributions is ascribed to brightness distribution and chromaticity distribution of a light source.

In a liquid crystal display device, since the amount of transmitted light from a light source is adjusted by a liquid crystal display panel and images are displayed by further separating the light, a person views directly the light source through the liquid crystal display panel. Accordingly, characteristics of the light source have a direct influence on the image quality of the liquid crystal display device. In the present invention, problems are addressed to improve the brightness distribution and the chromaticity distribution of a light source toward high image quality of the liquid crystal display device that is in the middle of the process of upsizing.

Hereinafter, specific causes that give rise to the brightness distribution and the chromaticity distribution of the light source are described.

The brightness distribution and the chromaticity distribution of cold cathode fluorescent lamp (CCFL) that is currently used as a white light source are mainly generated in the direction of tube axis. From the study by the present inventors, it was found that temperature characteristics of a phosphor are one of the causes of generation of the brightness distribution and the chromaticity distribution in the direction of tube axis. The temperature characteristics refer to a behavior in which characteristics of light emission from the phosphor change depending on temperature. The temperature of CCFL is very high at the both end portions where electrodes are arranged, and the temperature of the tube goes down from the both end portions toward the center of the tube. By this temperature distribution of CCFL and the temperature characteristics of the phosphor, the brightness distribution in the direction of tube axis is generated. Since the temperature characteristics of the phosphor differ depending on the material thereof, the chromaticity distribution in the direction of tube axis is also generated at the same time due to a loss of intensity balance of red, green, and blue light emission.

Further, the studies on the temperature distribution of CCFL and the temperature characteristics of the phosphor by the present inventors resulted in finding that the temperature characteristics of red phosphor $(Y,Eu)_2O_3$ have a great influence on the brightness distribution and the chromaticity distribution.

The temperature characteristics of the red phosphor $(Y,Eu)_2O_3$ when excited by vacuum ultraviolet ray (VUV) and the temperature characteristics of the red phosphor $(Y,Eu)_2O_3$ when excited by 254 nm ultraviolet light are shown in FIGS. 8 and 9, respectively. In each of the figures, brightness is indicated by relative values when the brightness at room temperature of 30 degrees C. was taken as 100%.

As described earlier, CCFL has a very long and narrow shape, and its diameter of tube is very small. In such a case, 185 nm vacuum ultraviolet ray is also radiated from excited mercury in addition to 254 nm ultraviolet light, and the contribution of this vacuum ultraviolet ray becomes large. The present inventors focused attention on this contribution of the vacuum ultraviolet ray as well as the temperature characteristics of the phosphor under vacuum ultraviolet excitation.

As a result, it was found that changes in brightness due to temperature were hardly observed when excited by 254 nm ultraviolet light, while brightness decreased significantly with the increase of temperature when excited by vacuum ultraviolet ray as apparent from FIGS. 8 and 9. Accordingly, in CCFL, the effect of the temperature characteristics under vacuum ultraviolet ray excitation becomes large as shown in FIG. 8, giving rise to brightness distribution in the direction of CCFL tube axis. Further, the brightness of red color changes significantly due to the tube temperature, and therefore, a portion high in the tube temperature (for example, near an electrode) turns into a white color poor in red color component (high color temperature). On the other hand, a portion low in the tube temperature turns into a white color rich in red color component (low color temperature).

The temperature distribution of CCFL and the brightness distribution and the chromaticity distribution due to the temperature characteristics of the phosphor seem to cause increasingly major problems in accordance with upsizing of liquid crystal display device in the future. In recent years, upsizing of liquid crystal television has advanced rapidly, and it is accompanied by making CCFL, a light source, longer. For example, the length of CCFL for 32-inch liquid crystal television is 720 mm, and further, its length for 52-inch liquid crystal television is as long as 1200 mm, which is very long. Such a long CCFL tends to generate temperature distribution. That is, the brightness distribution and the chromaticity distribution tend to be generated. Furthermore, an external electrode fluorescent lamp (EEFL) and a plane light source have recently been proposed as various light sources for liquid crystal display device, and similarly, the brightness distribution and the chromaticity distribution of these light sources as well become major problems.

The present invention aims to provide a white light source suppressed in the brightness distribution and the chromaticity distribution and a high image quality liquid crystal display device with the use thereof. It is needless to say that the present problems need to be solved without lowering conventional brightness.

In order to achieve the objects of providing a white light source suppressed in the brightness distribution and the chromaticity distribution and a high image quality liquid crystal display device with the use thereof, the present invention includes the following features.

As a first feature, a liquid crystal display device comprises a white light source provided with a blue phosphor that emits blue light, a green phosphor that emits green light, and a red phosphor that emits red light and a liquid crystal display panel having color filters to adjust the amount of transmitted light from the white light source for every pixel and transmit any one of blue, green, and red lights for every pixel, where the red phosphor is represented by a composition formula $(Y_{1-x-y},Gd_x,Eu_y)_2O_3$.

Alternatively, a liquid crystal display device comprises a white light source provided with a blue phosphor that emits blue light, a green phosphor that emits green light, and a red phosphor that emits red light and a liquid crystal display panel having color filters to adjust the amount of transmitted light from the white light source for every pixel and transmit any one of blue, green, and red lights for every pixel, where the red phosphor is represented by the composition formula $(Y_{1-x-y},Gd_x,Eu_y)_2O_3$ and the values of the composition ratio, x and y, satisfy the conditions of $0.45 \leq x$ and $y \leq 0.040$, respectively.

Further, in consideration of emission brightness, it is desired that the red phosphor is represented by the composition formula $(Y_{1-x-y},Gd_x,Eu_y)_2O_3$ and the values of the composition ratio, x and y, satisfy the conditions of $0.45 \leq x \leq 0.85$ and $0.025 \leq y \leq 0.040$, respectively. At this time, it is desirable that the crystal structure of the red phosphor is cubic. Further, it is desirable that the particle size as a median diameter $d_{50}$ is in the range of 2.0 μm to 6.0 μm.

In addition to the above feature, it is desirable that the white light source includes an airtight container provided with a blue phosphor, green phosphor, and red phosphor, electrodes attached to the airtight container, and a discharge medium sealed in the airtight container. Alternatively, the airtight container may be a light transmitting airtight tube.

At this time, it is desirable that the discharge medium is mainly composed of mercury or mainly composed of xenon.

Next, the electrodes that are structural members of the light source are preferably formed as follows: the electrodes attached to the airtight tube are placed on both ends of the airtight tube as well as inside the airtight tube. Alternatively, the electrodes attached to the airtight tube may be placed on both ends of the airtight tube as well as outside the airtight tube.

Further, one of the electrodes attached to the airtight tube may be placed on one end of the airtight tube as well as inside the airtight tube, and the other electrode is placed outside the airtight tube.

The shape of the light source may be as follows: the airtight tube is desirably a cylindrical glass tube having an inner diameter equal to or smaller than 10 mm. As one of specific light sources that meet these conditions, a cold cathode fluorescent lamp is desired.

On the other hand, when high image quality is taken into consideration for a liquid crystal display device in addition to suppression of the brightness distribution and the chromaticity distribution, the liquid crystal display device is desired to have the following features: the red light transmitting color filters that constitute a liquid crystal display panel desirably have a light transmittance equal to or lower than 50% in a light wavelength region lower than 600 nm to improve calorimetric purity.

Further, the liquid crystal display panel desirably includes a pair of transparent substrates opposite to each other, alignment layers coated on the inner surfaces of these substrates, a liquid crystal layer sandwiched between the alignment layers, and polarizing plates placed outside the pair of substrates, where the alignment layers are vertical alignment layers and the liquid crystal is aligned approximately vertically to the substrate surfaces when no voltage is applied and tilted against the surfaces of the substrates when voltage is applied, thereby adjusting the amount of transmitted light.

Owing to these features, the present invention makes it possible to obtain a white light source suppressed in the brightness distribution and the chromaticity distribution and a high image quality liquid crystal display device with the use thereof. Further, high brightness of the white light source can be achieved at the same time by using these features. As the result, the number of high cost members such as reflective polarizers included in a back light unit can be reduced, thereby enabling low-cost production of a liquid crystal display device.

BRIEF DESCRIPTION OF THE DRAWINGS

FIG. 18A represents a state in which display is off and FIG. 18B represents a state in which the display is on.

DETAILED DESCRIPTION OF THE PREFERRED EMBODIMENTS

In the present invention, a liquid crystal display device comprises a white light source provided with a blue phosphor that emits blue light (main emission peak wavelength of approximately from 400 to 500 nm), a green phosphor that emits green light (main emission peak wavelength of approximately from 500 to 600 nm), and a red phosphor that emits red light (main emission peak wavelength of approximately from 600 to 650 nm) and a liquid crystal display panel having color filters to adjust the amount of transmitted light from the white light source for every pixel and transmit any one of blue, green, and red lights for every pixel, where the red phosphor is represented by a composition formula $(Y,Gd,Eu)_2O_3$. That is, the greatest feature of the present invention resides in that a phosphor represented by a composition formula $(Y_{1-x-y},Gd_x,Eu_y)_2O_3$ ($0<x$, $0<y$) is used as the red phosphor of the white light source included in a back light unit of the liquid crystal display device.

This red phosphor is a phosphor in which part of yttrium in conventional $(Y,Eu)_2O_3$ is replaced by gadolinium. The composition formula may be represented by $(Y_{1-x-y},Gd_x)_2O_3:Eu_{2y}$, according to the common notation for phosphor materials. It should be noted that the composition of a phosphor shown here represents a basic composition in which a minute quantity of impurity is not taken into consideration. In general, flux is used when a phosphor is synthesized, and elements constituting the flux are sometimes present as minor impurities after the synthesis. Further, when a phosphor is baked, the phosphor comes in contact with a baking container (for example, alumina crucible), and thus, elements constituting the container are sometimes present in a minute quantity. The description in the present specification is not one in which impurities in a minute quantity that do not exert an effect on optical characteristics of a phosphor are taken into consideration.

Figure 8:
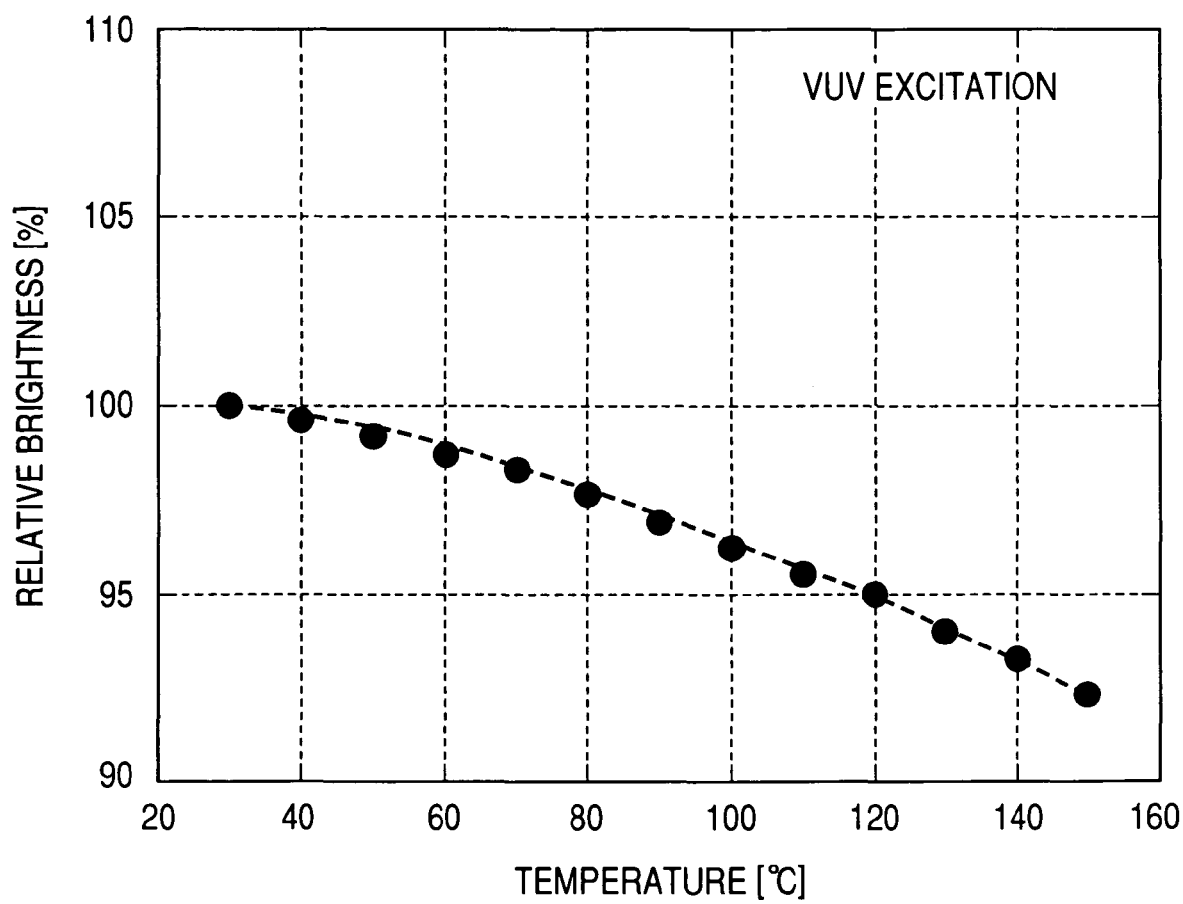
FIG. 8 is a graph showing temperature characteristics of a conventional red phosphor $(Y,Eu)_2O_3$ under vacuum ultraviolet ray excitation.
Figure 9:
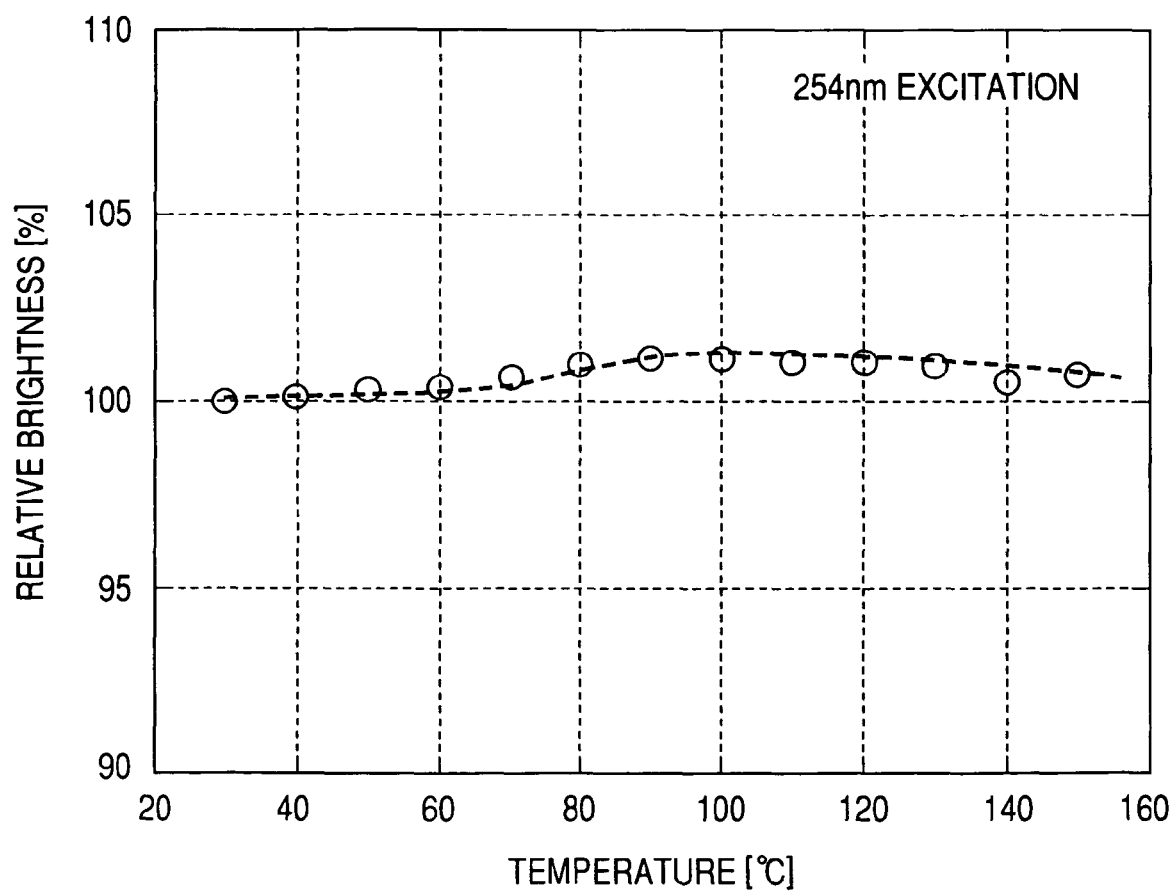
FIG. 9 is a graph showing temperature characteristics of the conventional red phosphor $(Y,Eu)_2O_3$ under 254 nm ultraviolet light excitation.

As mentioned earlier, the object of the present invention is to improve the brightness distribution and the chromaticity distribution of a light source because characteristics of the light source directly affect image quality of a liquid crystal display device. The present inventors have made efforts to solve this problem, which resulted in finding that temperature characteristics of the red phosphor $(Y,Eu)_2O_3$ are one of the causes of the brightness and chromaticity distributions of current cold cathode fluorescent lamp (CCFL). The temperature characteristics of the red phosphor $(Y,Eu)_2O_3$ are shown in FIGS. 8 and 9. The temperature characteristics when excited by vacuum ultraviolet ray (VUV) (FIG. 8) and when excited by 254 nm ultraviolet light (FIG. 9) are shown, respectively. In each of the figures, brightness is indicated by relative values when the brightness at room temperature of 30 degrees C. was taken as 100% in each case.

As shown in FIG. 9, changes in brightness due to temperature are hardly observed when excited by 254 nm ultraviolet light. In contrast, when excited by vacuum ultraviolet ray, it was found that brightness decreased significantly with the increase of temperature as shown in FIG. 8. When the diameter of tube is very small as in the case of CCFL, 185 nm vacuum ultraviolet ray is also radiated from mercury besides 254 nm ultraviolet light, and the contribution of this vacuum ultraviolet ray becomes large. Accordingly, the temperature dependence of brightness under vacuum ultraviolet excitation shown in FIG. 8 appears remarkably, giving rise to brightness and chromaticity distributions in the direction of CCFL tube axis.

Since in a liquid crystal display device the tube length of a white light source becomes longer as the display screen becomes larger, the temperature dependence of brightness and chromaticity distributions in the direction of CCFL tube axis appears to a greater degree, and color irregularity occurs between the center portion and the end portion of the screen, thus lowering image quality markedly.

Figure 1:
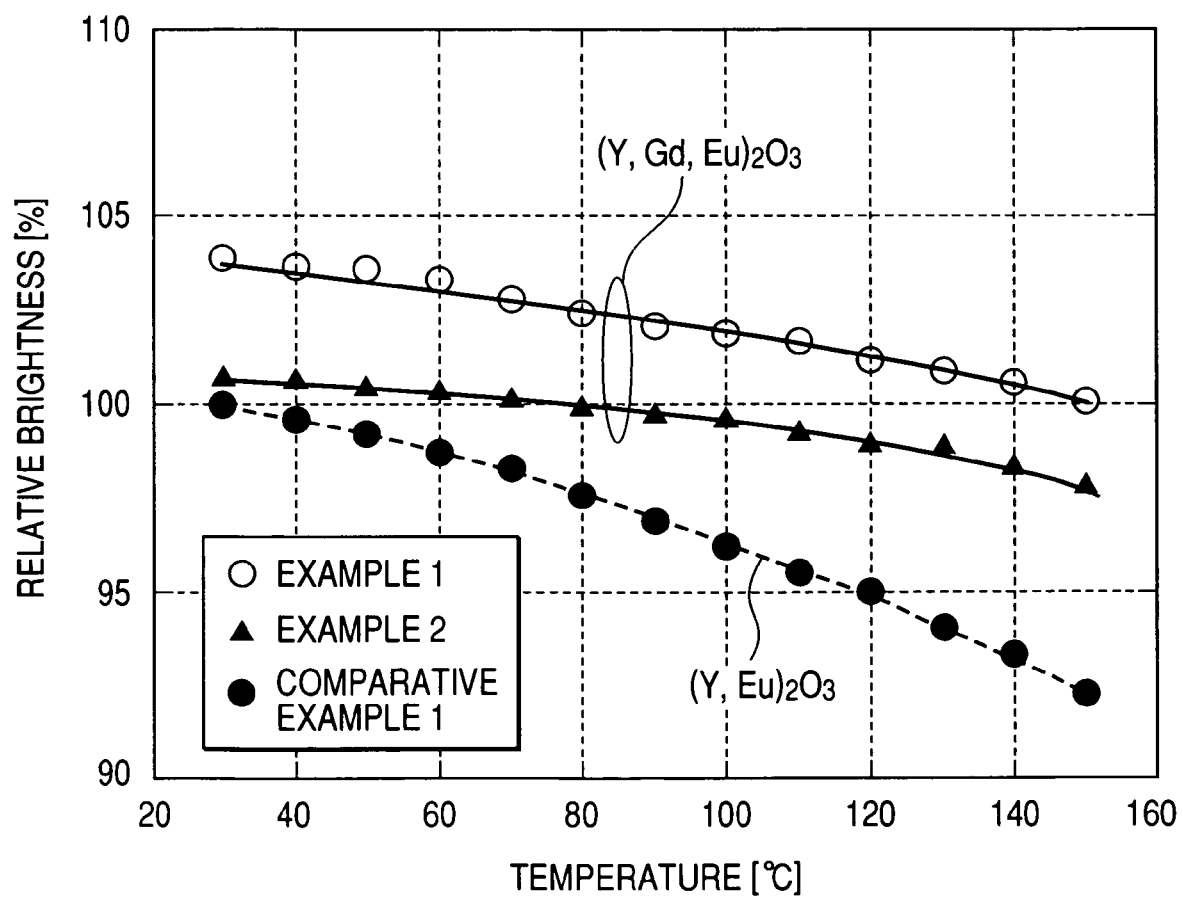
FIG. 1 is a graph showing temperature characteristics of a red phosphor of the present invention in comparison with a conventional example under vacuum ultraviolet ray (VUV) excitation.
Figure 2:
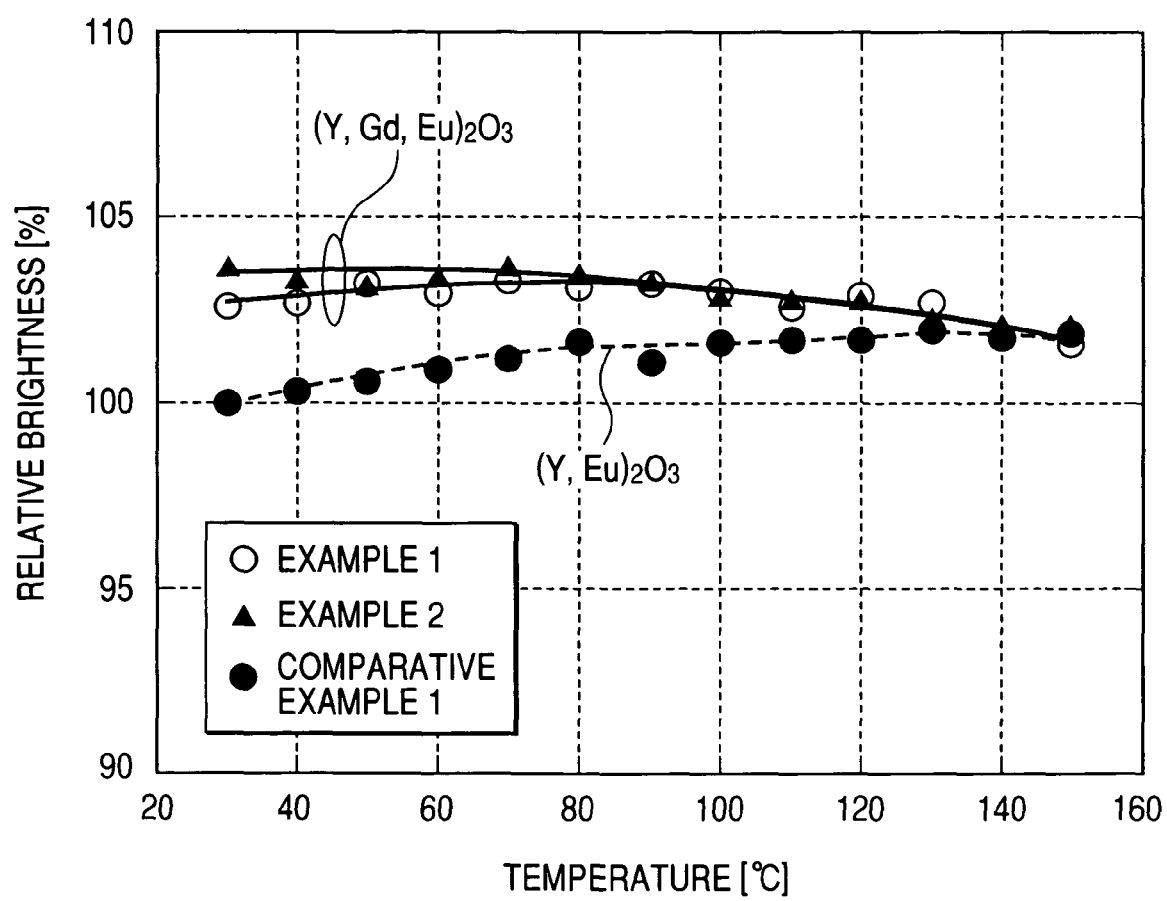
FIG. 2 is a graph showing temperature characteristics of the red phosphor of the present invention in comparison with the conventional example under 254 nm ultraviolet light excitation.

Hence, in the present invention, an attempt to solve the above problem was made by using $(Y_{1-x-y},Gd_x,Eu_y)_2O_3$ as the red phosphor for the white light source. From the study by the present inventors, it was found that the temperature characteristics of this phosphor could be greatly improved compared with those of the conventional $(Y,Eu)_2O_3$. The temperature characteristics of $(Y_{1-x-y},Gd_x,Eu_y)_2O_3$ are shown in FIGS. 1 and 2. The temperature characteristics when excited by vacuum ultraviolet ray (FIG. 1) and when excited by 254 nm ultraviolet light (FIG. 2) are shown, respectively.

As shown in FIG. 2, changes in brightness associated with temperature rise hardly occurred when excited at 254 nm, showing a behavior similar to the conventional red phosphor $(Y,Eu)_2O_3$.

On the other hand, it was found that brightness decrease associated with temperature rise was small even when excited by vacuum ultraviolet ray as shown in FIG. 1 and that the temperature characteristics were greatly improved compared with those of the conventional $(Y,Eu)_2O_3$. By the use of such red phosphor $(Y_{1-x-y},Gd_x,Eu_y)_2O_3$ improved in the temperature characteristics of the white light source, the brightness and chromaticity distributions of the light source that generate a temperature distribution can be reduced. As the result of further study, it was found that the composition ratio of the red phosphor desirably satisfied $0.45 \leq x$ and $y \leq 0.040$ in order to fully exert the effect of the present invention. It was further found that the above temperature characteristics were improved by satisfying the conditions of $0.45 \leq x \leq 0.85$ and $0.025 \leq y \leq 0.040$ and that brightness equal to or higher than that of the conventional $(Y,Eu)_2O_3$ was obtained. The reason of limiting the composition ratios shown here is described below.

Figure 3:
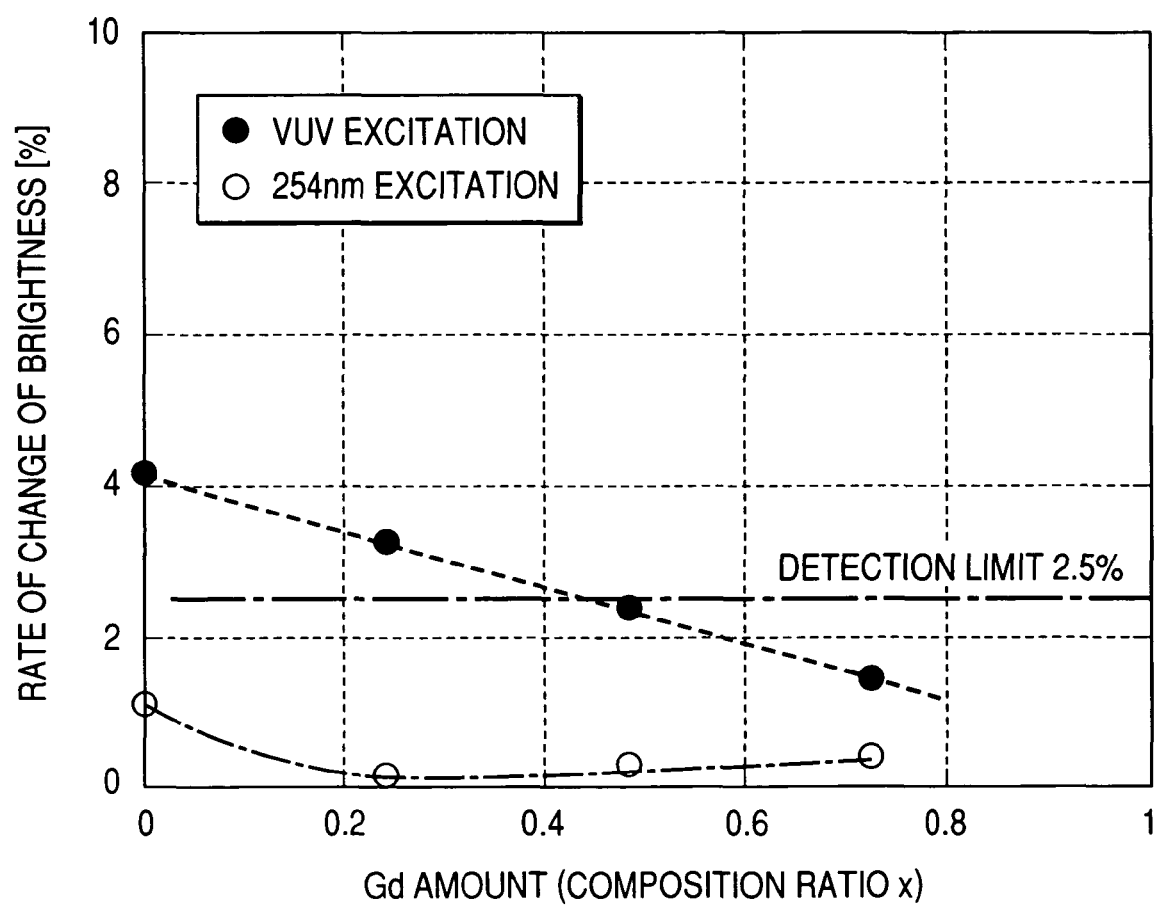
FIG. 3 is a graph showing dependence of the rate of change of brightness on Gd amount (composition ratio x) in the red phosphor serving as an example of the present invention.

FIG. 3 shows dependence of the rate of change of brightness on the amount of gadolinium (Gd) (composition ratio x). The rate of change of brightness on the vertical axis represents values calculated from the amount of change in brightness per unit temperature from 50 degrees C. to 120 degrees C. in consideration of the temperature change of CCFL tube. From previous studies, the detection limit is 2.5%, and it is thought that the rate of change of brightness below this detection limit presents no visual problem. From this figure, 2.5% is met irrespective of the amount of gadolinium in the case of 254 nm excitation. On the other hand, the rate of change of brightness depends on the amount of gadolinium to a significant degree in the case of vacuum ultraviolet ray excitation, and the rate of change of brightness tends to become smaller as the amount of gadolinium increases. When the composition ratio x exceeds 0.45, the rate of change of brightness becomes equal to or lower than 2.5%. Considering that the contribution of brightness is large under vacuum ultraviolet ray excitation as mentioned previously, $0.45 \leq x$ is desirable for CCFL.

Figure 4:
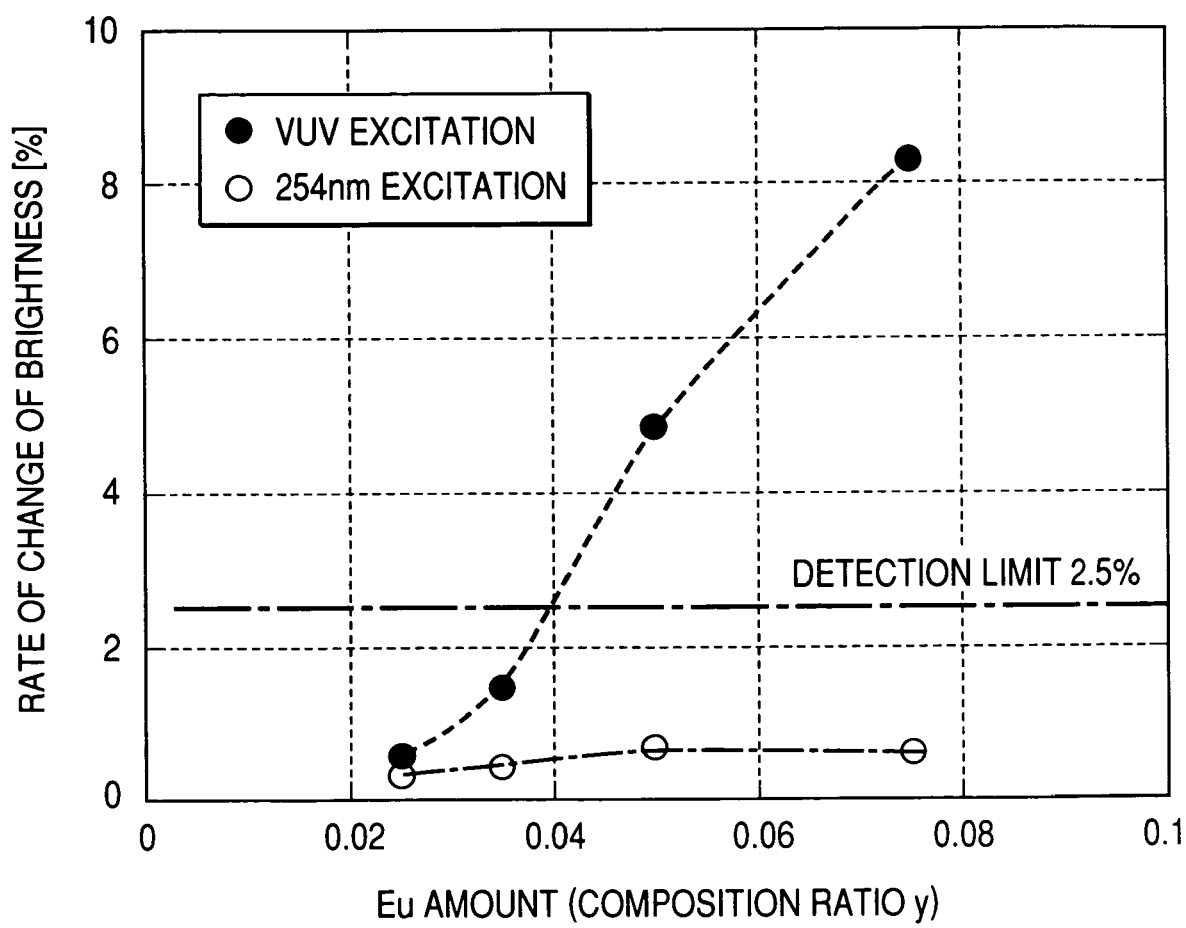
FIG. 4 is a graph showing dependence of the rate of change of brightness on Eu amount (composition ratio y) in the red phosphor serving as another example of the present invention.

FIG. 4 shows dependence of the rate of change of brightness on the amount of europium (Eu) (composition ratio y). From this figure, it is desirable to satisfy $y \leq 0.040$ in order to satisfy the rate of change of brightness of 2.5% or lower level.

The detailed mechanism that allows the temperature characteristics to be thus improved by replacing part of yttrium by gadolinium is unclear. In the case of 254 nm ultraviolet light, europium that is the luminescence center is directly excited, while in the case of vacuum ultraviolet ray, the luminescence center is excited via a host material. At present, a defect in the host crystal is thought to be involved.

Figure 5:
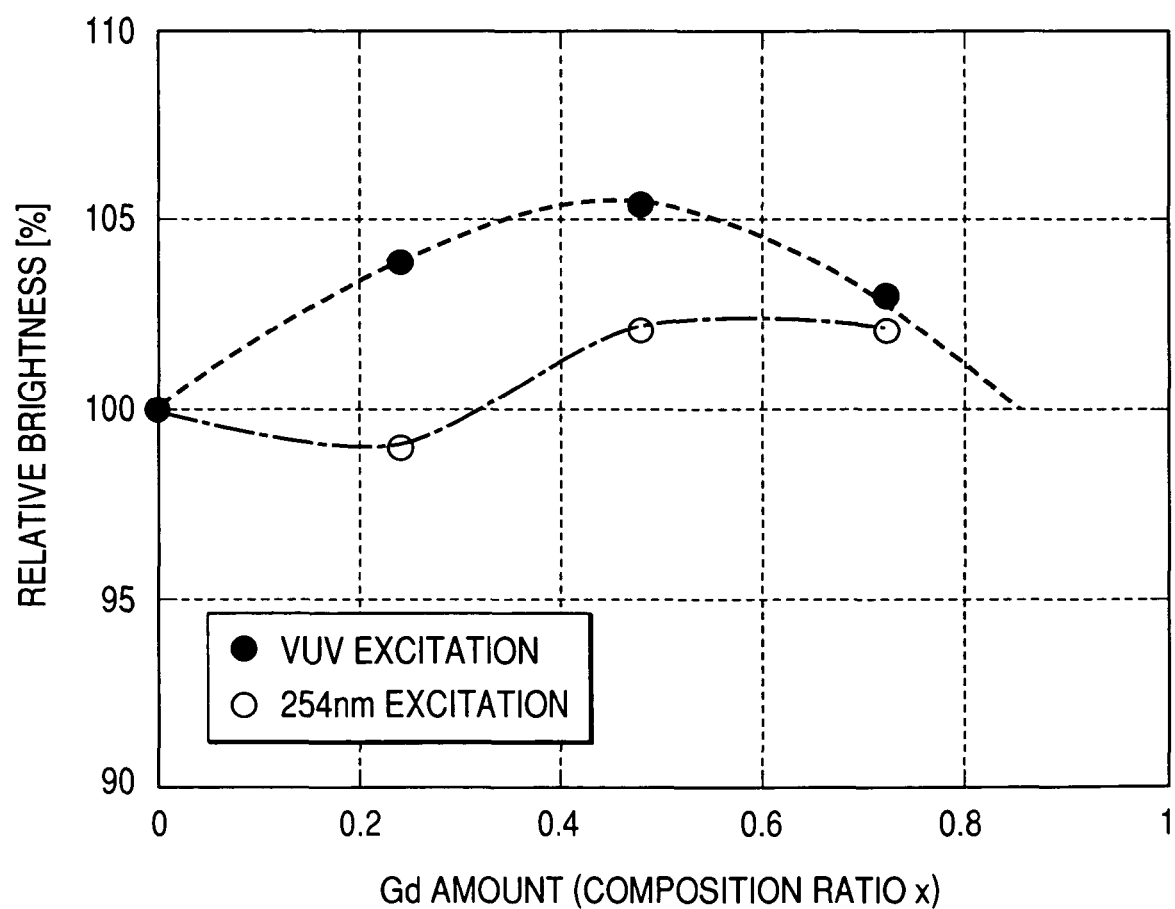
FIG. 5 is a graph showing dependence of relative brightness of the red phosphor serving as still another example of the present invention on Gd amount (composition ratio x)
Figure 6:
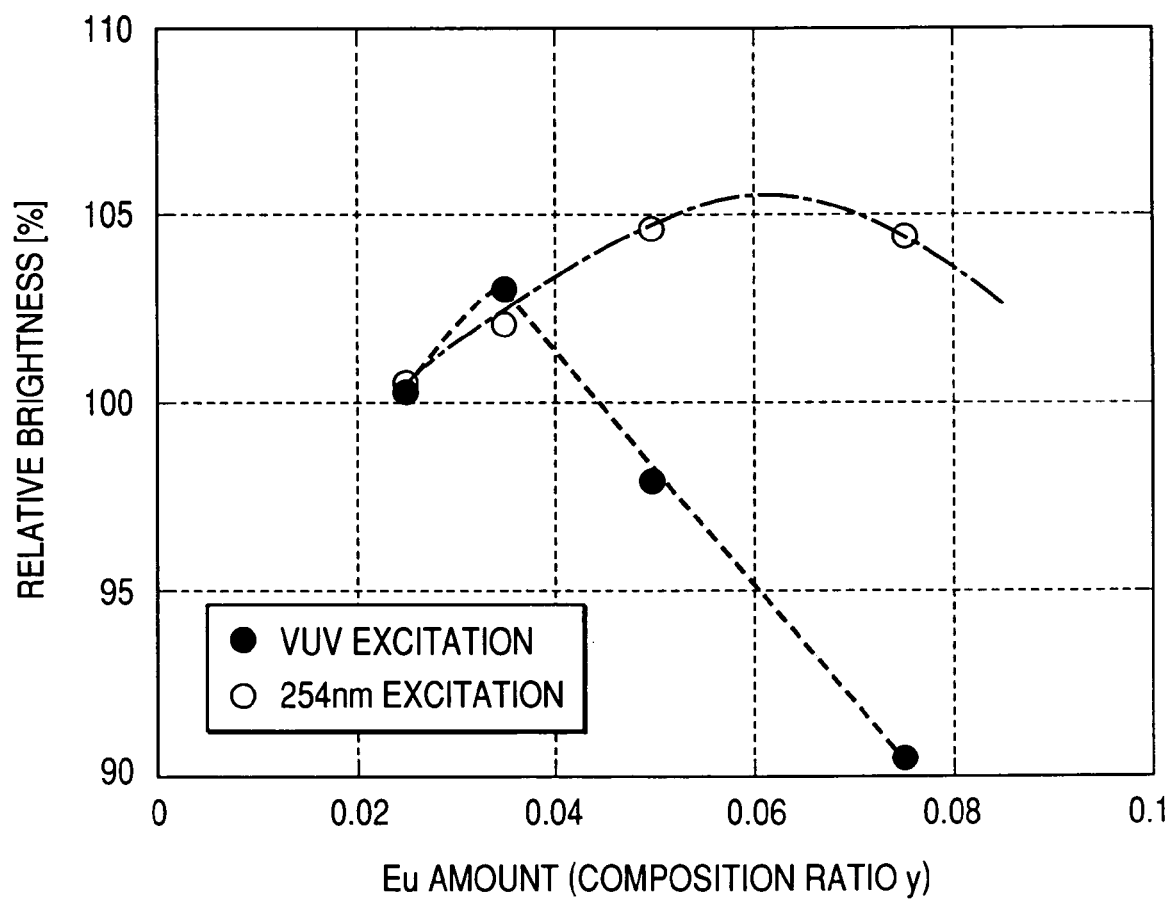
FIG. 6 is a graph showing dependence of the relative brightness of the red phosphor serving as still another example of the present invention on Eu amount (composition ratio y)

Further, the phosphor of concern needs brightness at least comparable to that of the current phosphor in addition to improvement in the temperature characteristics. FIGS. 5 and 6 show dependence of relative brightness on the composition ratio of gadolinium x and dependence of relative brightness on the composition ratio of europium y. The relative brightness on the vertical axis was shown by relative values where brightness of $(Y,Eu)_2O_3$ at the tube temperature of 100 degrees C. under each excitation source was taken as 100%. The behaviors of relative brightness profiles differ between excitation under 254 nm and excitation under vacuum ultraviolet ray. However, as long as brightness exceeds 100% in both cases, brightness at least higher than the current phosphor is thought to be obtained when used in CCFL. Accordingly, when considered in combination with the above conditions satisfying the rate of change of brightness, the composition ratios are desired to be $0.45 \leq x \leq 0.85$ and $0.025 \leq y \leq 0.040$, respectively.

The crystal structure of the red phosphor represented by the composition formula $(Y_{1-x-y},Gd_x,Eu_y)_2O_3$ is desired to be cubic. This red phosphor can be obtained by baking oxides coprecipitated by dissolving raw materials, $Y_2O_3$, $Gd_2O_3$, and $Eu_2O_3$ in an acid (for example, nitric acid) at a temperature between approximately 1,400 and 1,600 degrees C. This composition sometimes yields monoclinic crystal when the baking temperature is extremely high. When the crystal is monoclinic, a maximum peak wavelength of the emission spectrum lies between 615 nm and 630 nm, and the maximum peak wavelength is shifted toward longer wavelength compared with the conventional $(Y,Eu)_2O_3$. This results in a loss of luminous efficacy, thus giving rise to a significant decrease in brightness.

On the other hand, when the crystal is cubic, the present phosphor $(Y,Gd,Eu)_2O_3$ (for example, FIG. 7 and Example 2 to be described later) as well as the conventional phosphor $(Y,Eu)_2O_3$ (for example, FIG. 7 and Comparative example 1 to be described later) give approximately the same emission spectrum, and there is no decrease in brightness due to the loss of luminous efficacy.

As for the particle diameter of the phosphor, a median diameter $d_{50}$ is desired to be in the range of 2.0 μm to 6.0 μm. The phosphor having a particle diameter larger than this particle diameter or the phosphor having a particle diameter smaller than this particle diameter does not show the optical effect mentioned above. Here, the median diameter is a diameter when 50% of the particles, by mass, are larger than that size and 50% are smaller in the particle distribution of the phosphor particles.

It is desirable to use such a phosphor for white light sources of liquid crystal display devices. The white light sources provided with the red phosphor are described next. Although the main stream of white light sources is currently CCFL, various other white light sources have recently been proposed. For example, there are an external electrode fluorescent lamp (EEFL), xenon lamp, and plane light source. In these white light sources as well, the temperature distribution of the light source easily occurs, and the problem mentioned earlier can be solved by using the red phosphor $(Y,Gd,Eu)_2O_3$ proposed in the present invention. Hereinafter, the structures and characteristics of various light sources and effectiveness of using the red phosphor $(Y,Gd,Eu)_2O_3$ are described. Through the drawings of these structures, like components are denoted by like reference numerals.

(1) CCFL and HCFL

Figure 11:
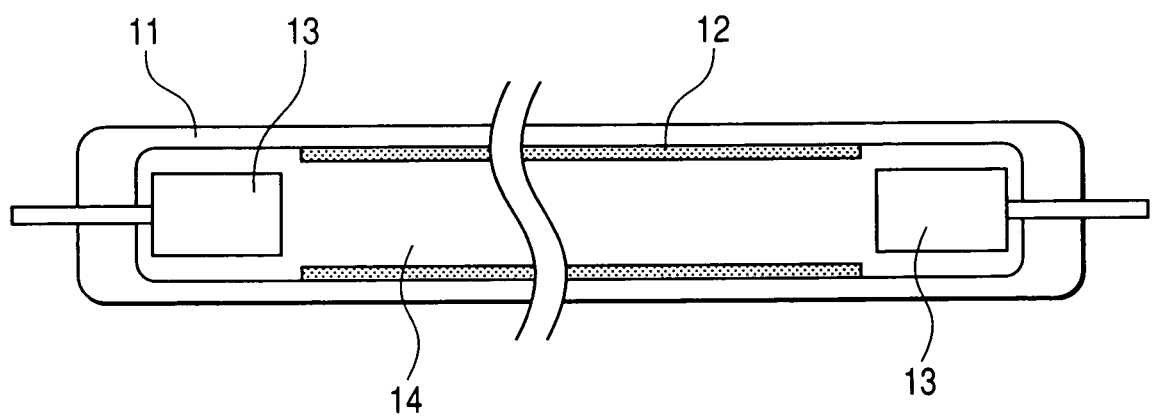
FIG. 11 is a diagram showing an outline of a cross sectional structure of a cold cathode fluorescent lamp (CCFL) serving as still another example of the present invention.

CCFL has a cross sectional structure shown in FIG. 11. That is, CCFL has a structure in which a phosphor 12 is provided on the inside of a light transmitting airtight tube (glass tube 11) and a discharge medium 14 is sealed in the tube. Electrodes 13 are arranged on both ends of the tube as well as arranged within the tube. The discharge medium has mercury as the main component, and in addition, a rare gas such as argon or neon is also sealed in. When CCFL is lighted on, the electrodes serve as a heat source to generate temperature distribution in the direction of the tube axis, and the above-described brightness and chromaticity distributions due to the temperature characteristics of the phosphor are generated.

For excitation of the phosphor, ultraviolet light emitted from mercury is utilized. However, since the diameter of tube is as small as about 3 to 5 mm, 185 nm vacuum ultraviolet ray is also radiated besides 254 nm, and an influence of excitation by the vacuum ultraviolet ray is large. Accordingly, the use of the above $(Y,Gd,Eu)_2O_3$ capable of improving the temperature characteristics of phosphor as the red phosphor makes it possible to suppress the brightness and chromaticity distributions of CCFL. The contribution of 185 nm vacuum ultraviolet ray is particularly large when the diameter of tube is not larger than 10 mm, and it is effective to use $(Y,Gd,Eu)_2O_3$ as the red phosphor.

Figure 12:
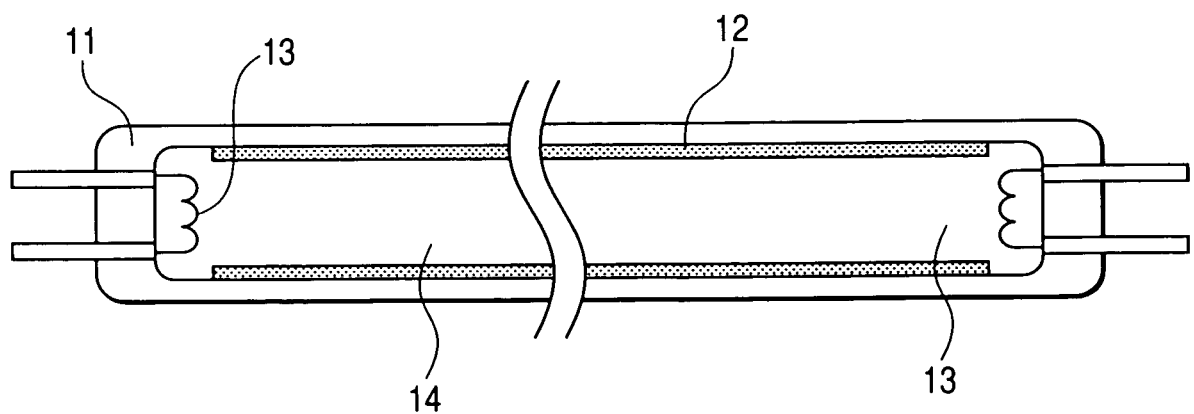
FIG. 12 is a diagram showing an outline of a cross sectional structure of a hot cathode fluorescent lamp (HCFL) serving as still another example of the present invention.

Further, not only CCFL but also hot cathode fluorescent lamp (HCFL) may be used as the white light source, and $(Y,Gd,Eu)_2O_3$ may be used as its phosphor. As shown in FIG. 12, HCFL has a structure similar to that of CCFL but differs greatly in the respect that metal electrode portions are filament electrodes. When voltage is applied to HCFL, thermoelectrons are emitted from the filament, and mercury is excited by these thermoelectrons to radiate ultraviolet light. The temperature distribution and the brightness and chromaticity distributions due to the temperature characteristics of the phosphor that are similar to CCFL are also generated in HCFL. Accordingly, the use of $(Y,Gd,Eu)_2O_3$ capable of improving the temperature characteristics as the red phosphor makes it possible to suppress the brightness and chromaticity distributions.

(2) EEFL

Figure 13:
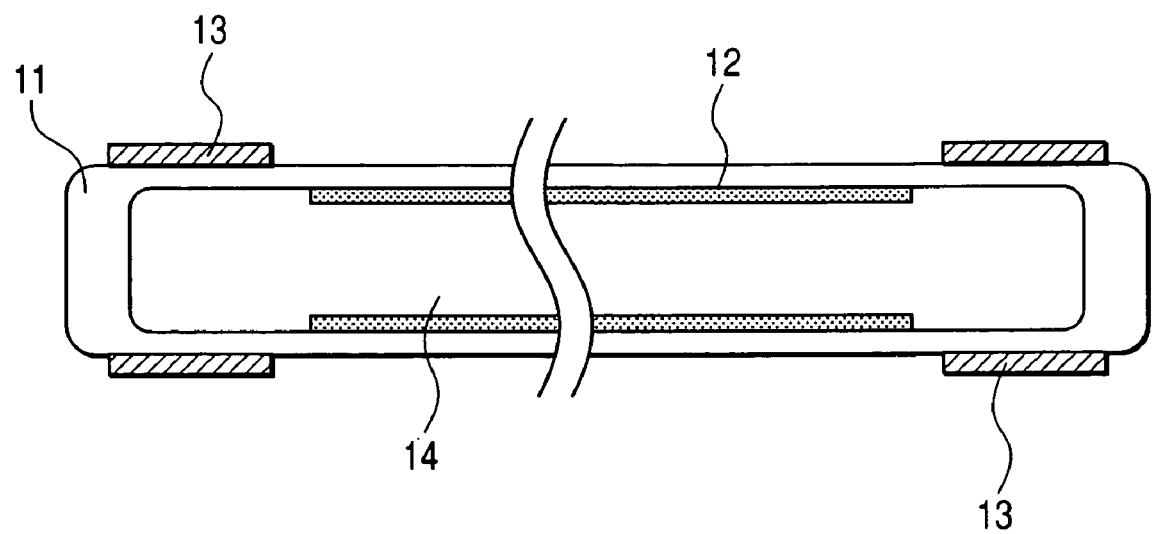
FIG. 13 is a diagram showing an outline of a cross sectional structure of an external electrode fluorescent lamp (EEFL) serving as still another example of the present invention.

EEFL has a cross sectional structure shown in FIG. 13. It has a structure similar to that of CCFL and is provided with a phosphor 12 in a light transmitting airtight tube (glass tube 11). However, it differs from CCFL in the respect that electrodes 13 are placed on both end portions of the tube as well as on the outer surface of the tube.

In EEFL, high voltage is applied to these external electrodes to excite mercury in the tube by an induction field, and the phosphor is stimulated to emit light by 254 nm ultraviolet light or 185 nm vacuum ultraviolet ray radiated from mercury. In EEFL, the glass tube on the underside of the electrodes serves as a dielectric layer, and heat is generated by energy loss at this dielectric layer. The temperature of the end portions of the electrodes at this time becomes higher than that of the end portions of CCFL. Owing to this, temperature variation in the direction of tube axis becomes larger, resulting in generation of the brightness distribution and the chromaticity distribution more extensive than those in CCFL. Accordingly, the use of (Y,Gd,Eu) 203 capable of improving the temperature characteristics as the red phosphor makes it possible to suppress the brightness and chromaticity distributions of EEFL.

(3) Xenon Lamp

Figure 14:
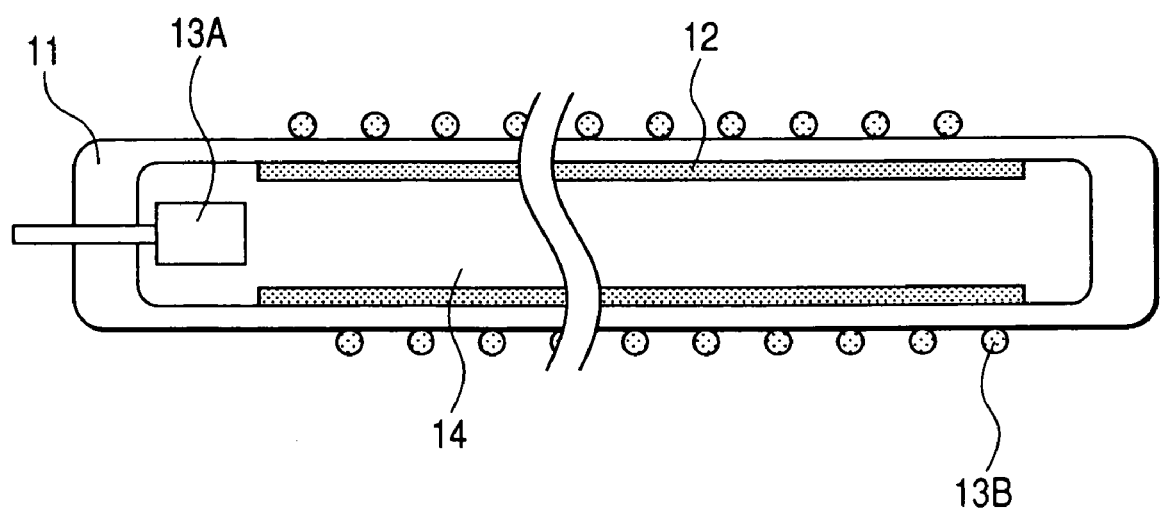
FIG. 14 is a diagram showing an outline of a cross sectional structure of a xenon lamp serving as still another example of the present invention.

Xenon lamp has a cross sectional structure shown in FIG. 14. That is, the xenon lamp has a structure in which a phosphor 12 is provided on the inside of a light transmitting airtight tube (glass tube 11), one electrode 13A is arranged in the inside of one end of the tube, and the other electrode 13B is arranged outside so as to wrap around the tube. A discharge medium 14 sealed in the tube is mainly composed of xenon. In the xenon lamp, the phosphor is stimulated to emit light using vacuum ultraviolet ray emitted from xenon as an excitation source. Thus, in the case of the conventional red phosphor $(Y,Eu)_2O_3$, the temperature characteristics under vacuum ultraviolet ray excitation (FIG. 8) manifest themselves more strongly, and the brightness distribution and the chromaticity distribution differ significantly compared with CCFL. Accordingly, the use of $(Y,Gd,Eu)_2O_3$ capable of improving the temperature characteristics as the red phosphor makes it possible to suppress the brightness and chromaticity distributions of the xenon lamp.

(4) Plane Light Source

Figure 15:
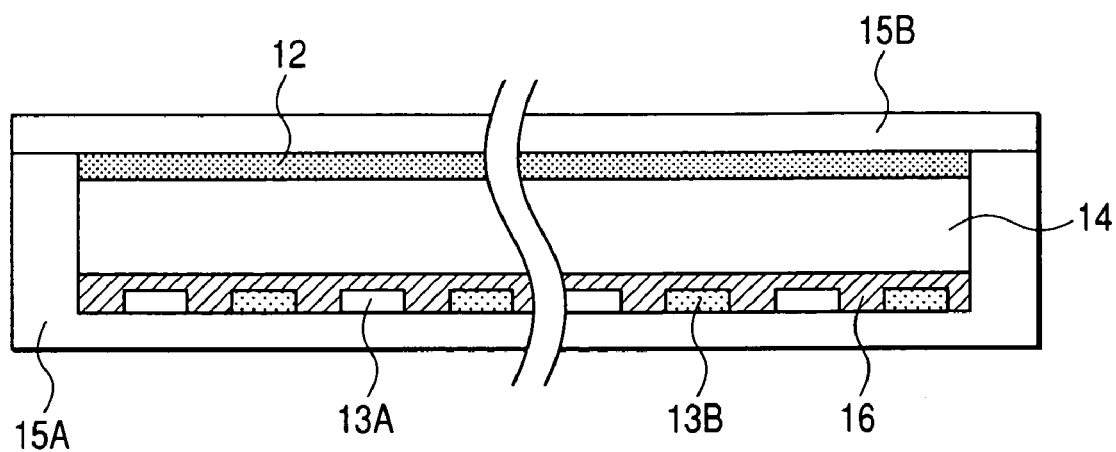
FIG. 15 is a diagram showing an outline of a cross sectional structure of a plane light source serving as still another example of the present invention.

A plane light source has a cross sectional structure shown in FIG. 15. That is, the plane light source has a structure including an airtight container 15 (back glass 15A, front glass 15B) provided with a phosphor 12 and electrodes 13 (13A, 13B) arranged on the back glass. A dielectric 16 is further arranged over the electrodes. A discharge medium 14 is sealed in the airtight container. Xenon is mainly used for the discharge medium; however it differs depending on the kind of the plane light source. Similarly to other lamps, voltage is applied to the electrodes to generate discharge in the airtight container, and the phosphor is stimulated to emit light by ultraviolet light from the discharge medium as an excitation source. Since the whole surface serves as the emission surface at this time, temperature uniformity in the surface is required. However, a plane light source for a large liquid crystal display device has a wide surface, thus resulting in a tendency to generate a temperature distribution in the surface. Accordingly, the use of $(Y,Gd,Eu)_2O_3$ capable of improving the temperature characteristics as the red phosphor makes it possible to suppress the brightness and chromaticity distributions of the plane light source.

The use of a back light provided with one of these light sources makes it possible to obtain a high image quality liquid crystal display device in which the brightness distribution and the chromaticity distribution are suppressed. Further, the use of these white light sources having $(Y_{1-x-y},Gd_x,Eu_y)_2O_3$ as the red phosphor makes it possible to obtain a liquid crystal display device with high colorimetric purity. This is due to the reason described below.

A liquid crystal display device performs color display by separating the light from a white light source using color filters on the liquid crystal display panel. Accordingly, for example, red color is visually recognized as a characteristic of the product of the emission characteristic of a red phosphor and the transmission characteristic of a red color filter.

Figure 7:
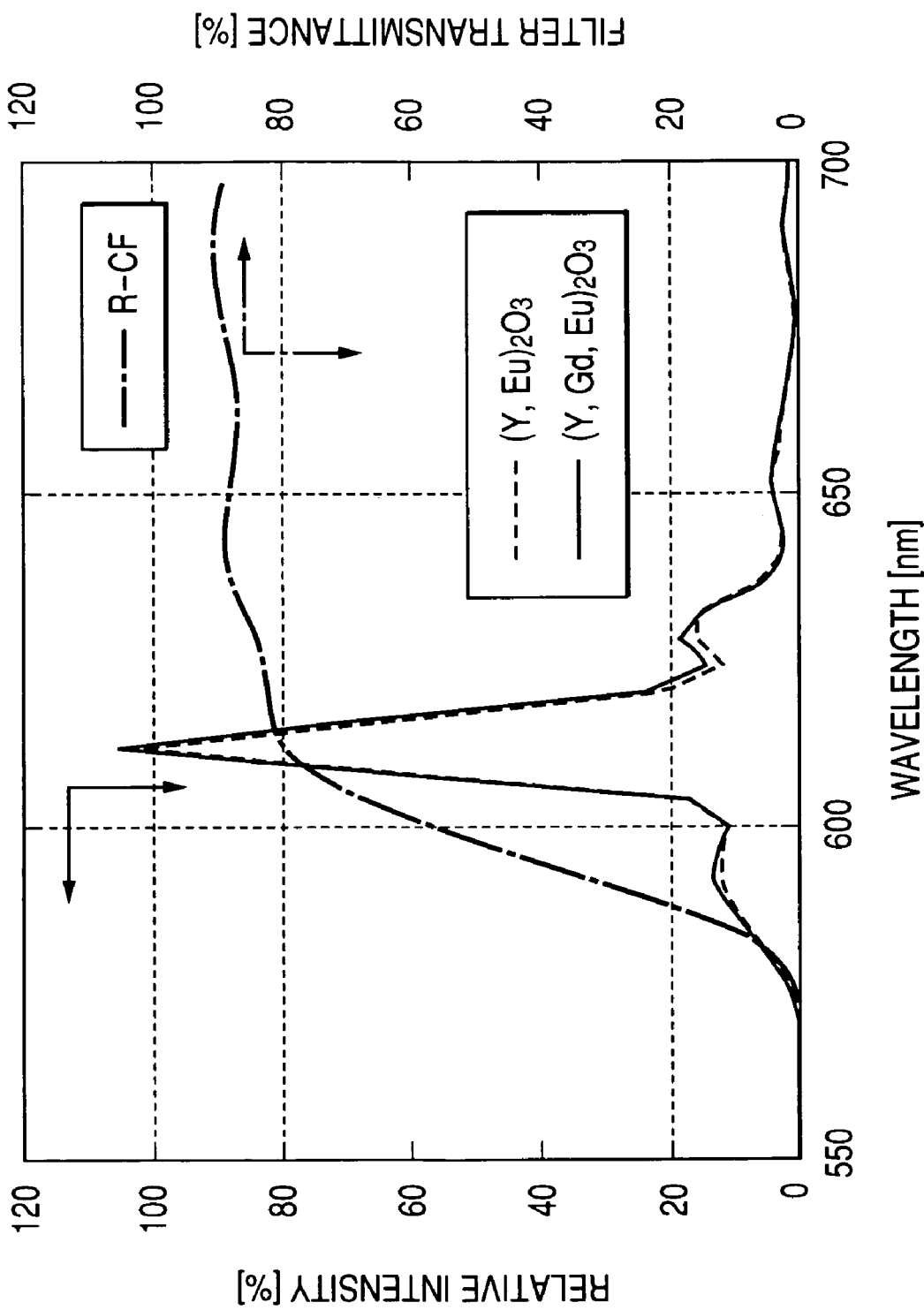
FIG. 7 is a graph showing emission spectra of the red phosphor and a transmittance profile of a red color filter.

The spectral profile of a red color filter and the emission profiles of red phosphors are shown in FIG. 7. The emission spectra have three main peaks (around 590 nm, 610 nm, and 630 nm). The intensities of each peak in $(Y_{1-x-y},Gd_x,Eu_y)_2O_3$ are higher than those in the conventional $(Y,Eu)_2O_3$, and particularly the rate of change of peak intensity of the subpeak (around 630 nm) on the longer wavelength side is large. When considered with the transmission profile of the color filter, an effect of improvement in intensity at 630 nm peak on the longer wavelength side where the transmittance of the color filter is high becomes significant. Although the improvement in intensity is also observed for the 610 nm peak, the effect is counterbalanced due to the low transmittance of the color filter. That is, only the effect of improvement in intensity at 630 nm becomes significant, thus allowing the calorimetric purity to be improved. To counterbalance the effect of improvement in intensity for the 610 nm peak by the transmittance of the color filter, it is desirable that the transmittance of the red color filter is equal to or lower than 50% below 600 nm.

The light source provided with such a red phosphor becomes effective when combined with a vertically aligned (VA) mode liquid crystal display panel. Liquid crystal display panel is classified into various modes depending on the initial alignment state of liquid crystal molecules and the driving method thereof. At present, an in-plane switching (IPS) mode, VA mode, optically compensated bend (OCB) mode, and twisted nematic (TN) mode are typical. The present invention can be applied to all modes; however, particularly when combined with a VA mode liquid crystal display panel, a drawback associated with the VA mode liquid crystal display panel can be improved. The reason is described below.

Figure 18:
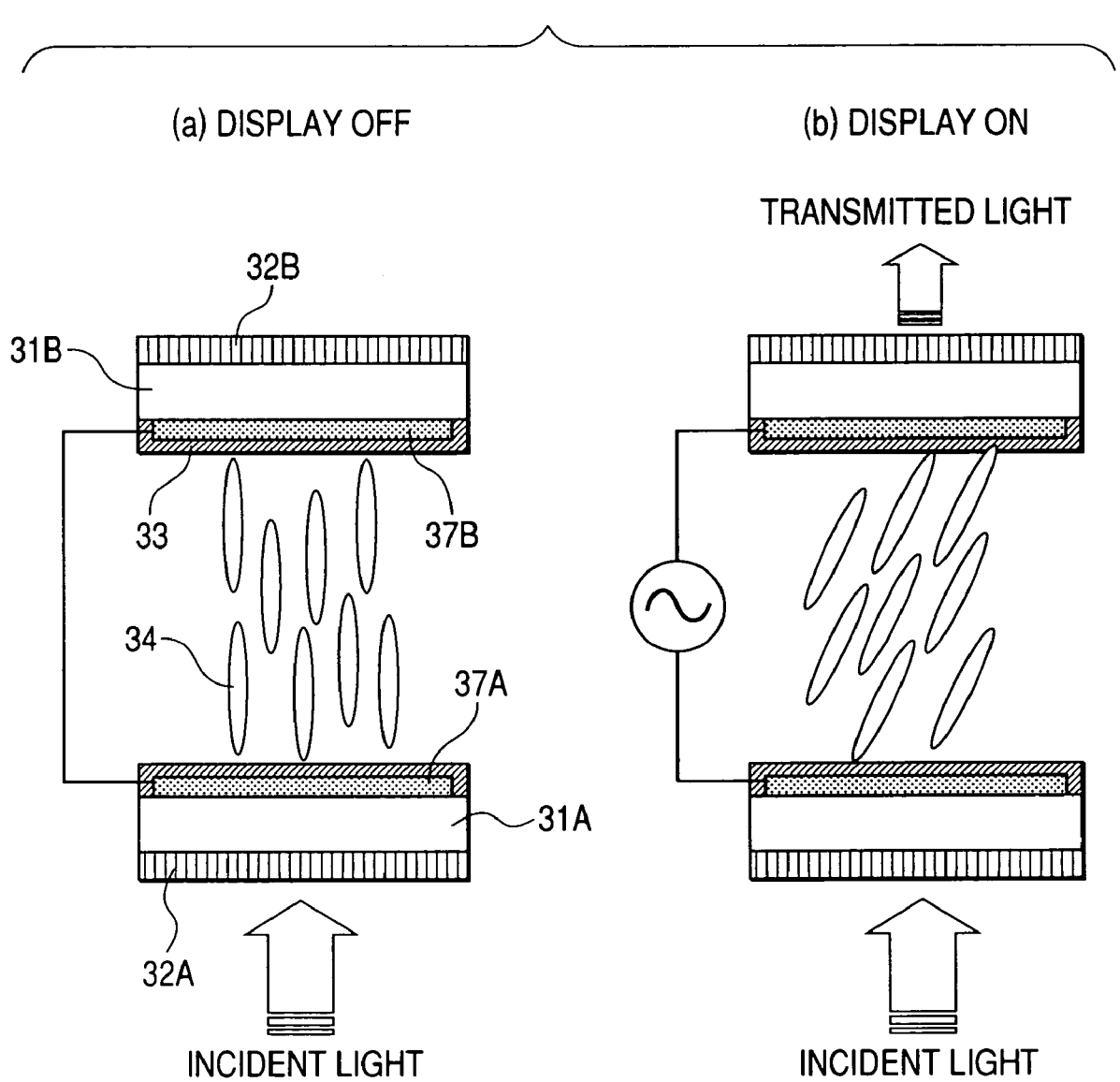
FIG. 18 is a diagram explaining an outline of a vertically aligned (VA) mode liquid crystal display panel, where

The VA mode liquid crystal display panel includes a pair of substrates 31 (31A and 31B) opposite to each other as shown in FIG. 18, alignment layers 33 coated on the inner surfaces of these substrates, and a liquid crystal 34 sandwiched between the alignment layers. Further, polarizing plates 32 (32A and 32B) are arranged on the outer surfaces of the substrates. The alignment layers are vertical alignment layers. Electrodes 37 (37A and 37B) are formed on each of the both substrates, and voltage is applied between these electrodes. When no voltage is applied, the liquid crystal assumes a state in which the longitudinal direction of the liquid crystal is approximately perpendicular to the substrate surfaces (FIG. 18A). At this time, display of the liquid crystal display device is off, that is, black display. Next, when voltage is applied to the electrodes, an electric field in the direction approximately perpendicular to the substrate surfaces is generated, and the liquid crystal molecules are tilted against the substrate surfaces by this electric field. Thereby the refractive index of the liquid crystal layer is changed, and the amount of light from a light source is adjusted. FIG. 18B shows the state, where display of the liquid crystal display device is on.

This VA mode has a drawback of significant change in chromaticity at different view angles that is peculiar to the VA mode. Particularly, the change in chromaticity on grey level display is large. Thus, the image quality of the VA mode liquid crystal display device is greatly reduced because of a synergistic effect of the change in chromaticity of the light source and the change in chromaticity arising from the liquid crystal display panel compared with other display modes. Particularly, when both end portions of a screen of the VA mode liquid crystal display device having a large screen are viewed, the change in chromaticity becomes largest due to the synergistic effect of the change in chromaticity near the CCFL electrodes and the change in chromaticity depending on view angle of the liquid crystal display panel.

Accordingly, the use of $(Y,Gd,Eu)_2O_3$ capable of improving the temperature characteristics as the red phosphor makes it possible to suppress the change in chromaticity of CCFL and reduce the view angle dependence of chromaticity in the VA mode liquid crystal display device. That is, a large VA mode liquid crystal display device having high image quality can be obtained.

EXAMPLES

Hereinafter, detailed examples are explained. However, the present invention is not limited to the following examples. A liquid crystal display device prepared using a conventionally used red phosphor $(Y,Eu)_2O_3$ will be described in a comparative example 1. It should be noted that, through the following examples, like components are denoted by like reference numerals.

Example 1

Figure 10:
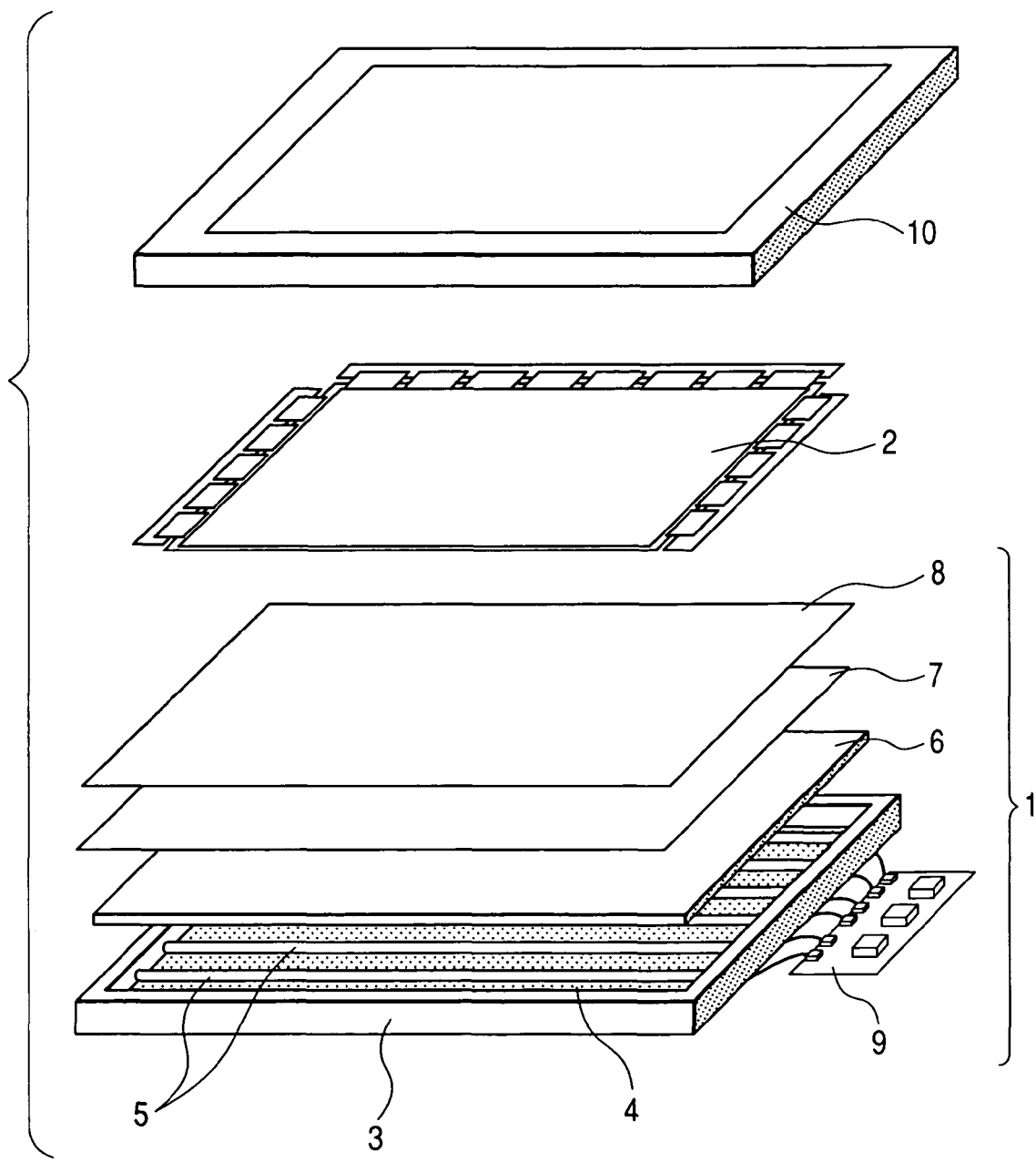
FIG. 10 is a diagram showing an exploded perspective view of a liquid crystal display device serving as still another example of the present invention.

The liquid crystal display device of the present invention included a back light unit 1 and a liquid crystal display panel 2 as shown in FIG. 10. Further, the back light unit 1 included a white light source 5, a driving circuit 9 (inverters) to illuminate the white light source, a housing 3, a reflector 4, a diffuser plate 6, a prism sheet 7, and a reflective polarizer 8. In the present example, CCFL shown in FIG. 11 was used as the white light source, and only a red phosphor $(Y,Gd_y,Eu_y)_2O_3$ used in the light source differed from conventional ones. Hereinafter, the production of CCFL using a red phosphor $(Y_{1-x-y},Gd_x,Eu_y)_2O_3$ and the production of an IPS mode liquid crystal display device using this CCFL are described.

1) Production of CCFL

Figure 17:
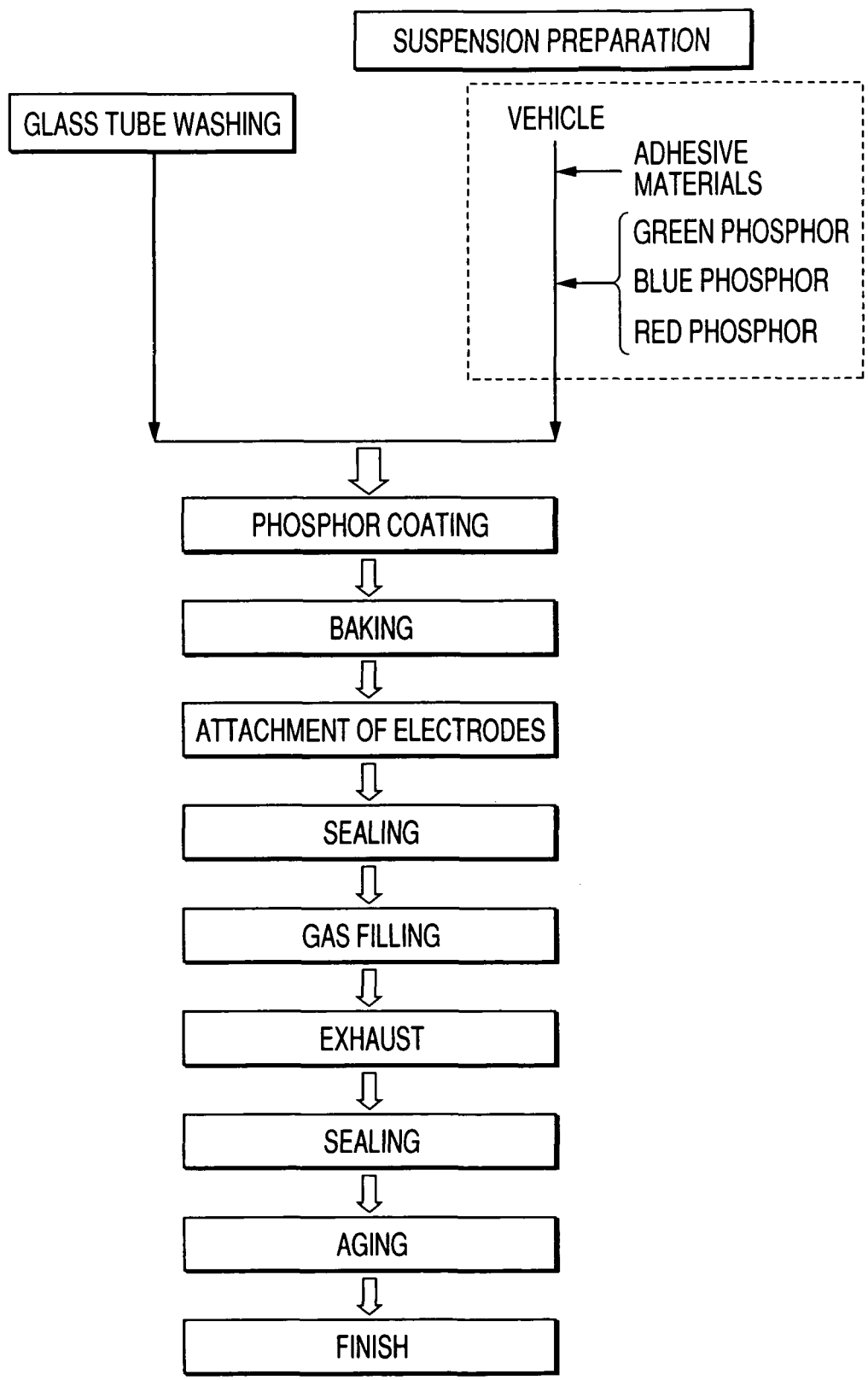
FIG. 17 is a flow diagram showing production of the cold cathode fluorescent lamp (CCFL) serving as still another example of the present invention.

The outline of the production procedures of CCFL is as shown in the flow in FIG. 17. First, adhesive materials such as alumina and each color phosphor material were mixed in an organic solvent called vehicle. In the present example, $(Y_{1-x-y},Gd_x,Eu_y)_2O_3$ (x=0.48,y=0.035) was used as the red phosphor. The blue phosphor and the green phosphor were $BaMgAl_{10}O_{17}:Eu^{2+}$ and $LaPO_4:Tb^{3+},Ce^{3+}$ that were the same as those of conventional materials, respectively. The particle diameter of the red phosphor was $d_{50}$=4.0 μm.

Next, one end of a glass tube washed in advance was dipped into this suspension, and the phosphor was coated on the inner wall of this glass tube by capillary action. The glass tube was made of kovar glass, and the diameter of the tube was 3 mm. The phosphor was fixed on the inner wall of the glass tube by baking the glass tube.

Then, electrodes were attached, and the one end of the glass tube was sealed. A gas pressure was adjusted by injecting and exhausting a rare gas such as argon or neon from the side opposite to the sealed side. After injecting mercury further, the glass tube was sealed. Finally, aging treatment was performed by lighting up the glass tube for a predetermined time.

2) Assembly of Back Light Unit

The structure of a back light unit 1 is explained with reference to FIG. 10. A plurality of the finished CCFLs 5 were arranged in the metal housing 3. In a liquid crystal display device demanding high brightness such as liquid crystal display television, a vertical system in which a plurality of CCFLs are arranged in a plane is employed.

The reflector 4 to make efficient use of light outgoing from CCFL to the housing side was arranged between the metal housing 3 and CCFL 5. Further, the diffuser plate 6 was arranged directly on CCFLs to suppress in-plane brightness distribution of the liquid crystal display device. Furthermore, the prism sheet 7 and the reflective polarizer 8 were arranged with the aim of enhancement of brightness of the liquid crystal display device. The inverters 9 were connected to CCFLs, and the lighting control of CCFLs was performed by driving of the inverters. These are collectively called back light unit.

3) Assembly of Liquid Crystal Display Device

The liquid crystal display panel 2 having color filters to adjust the amount of transmitted light from the backlight (white light source CCFLs) and separate light into red, green, and blue colors for every pixel was placed directly on the back light unit 1.

Figure 16:
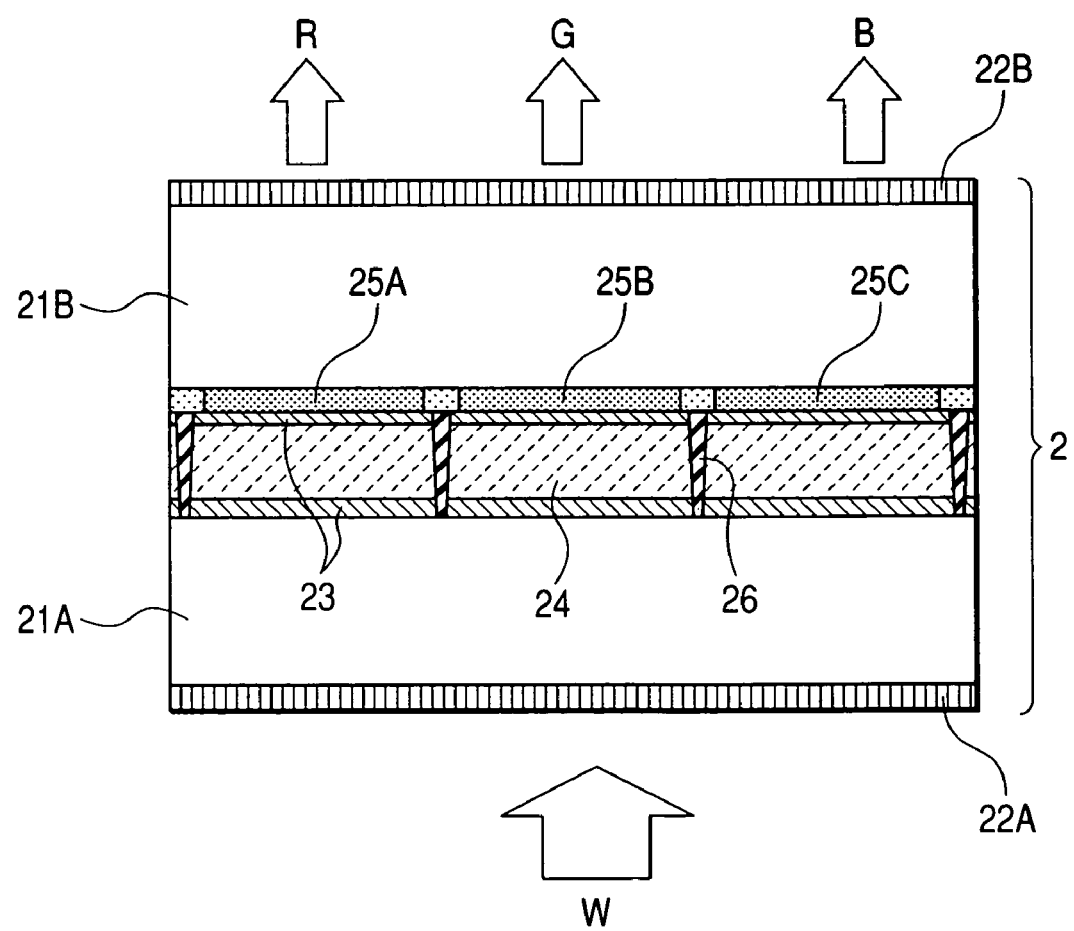
FIG. 16 is a diagram showing an outline of a cross sectional structure of a liquid crystal display panel serving as still another example of the present invention.

The schematic cross sectional diagram of the liquid crystal display panel is as shown in FIG. 16. Glass substrates having a thickness of 0.5 mm were typically used for substrates 21. On one substrate 21A, electrodes were formed for every pixel (not shown in FIG. 16), and thin film transistors (TFTs) to supply voltage to these electrodes were formed.

On the other substrate 21B, color filters 25 (red color 25A, green color 25B, and blue color 25C) were arranged for every pixel. On the surfaces of these pair of substrates, alignment layers 23 to align liquid crystal molecules were arranged, and further, liquid crystal 24 was sandwiched between these substrates. In addition, polarizing plates 22 (22A and 22B) were arranged on the outer surfaces of the substrates. The spectral profile of the red color filter in the present example had that shown in FIG. 7. Finally, the back light unit 1 and the liquid crystal display panel 2 were combined together and covered with a housing 10 to obtain a liquid crystal display device.

The temperature characteristics of the red phosphor $(Y_{1-x-y},Gd_x,Eu_y)_2O_3$ (x=0.48,y=0.035) used in the present example were as shown in FIGS. 1 and 2. In comparison with conventional $(Y,Eu)_2O_3$, the temperature characteristics particularly under vacuum ultraviolet ray excitation were improved to a significant degree, and the rate of change of brightness under vacuum ultraviolet ray excitation was 2.4%. This was below the detection limit of 2.5%, and the brightness distribution and the chromaticity distribution of CCFL were greatly improved, enabling to obtain a liquid crystal display device with excellent image quality. At the same time, brightness of 104% as CCFL was achieved when brightness of CCFL obtained in a comparative example 1 to be described later was taken as 100%. Furthermore, a red color having high calorimetric purity (CIE x,y=0.6674, 0.3298) could be obtained for the liquid crystal display device.

Example 2

Compared with the example 1, the present example differed only in the composition ratio of the red phosphor $(Y,Gd,Eu)_2O_3$ that was used. The composition ratio was x=0.72, y=0.035. The rest was otherwise the same as in the example 1.

The temperature characteristics of the red phosphor $(Y_{1-x-y},Gd_x,Eu_y)_2O_3$ (x=0.72,y=0.035) used in the present example were as shown in FIGS. 1 and 2. In comparison with conventional $(Y,Eu)_2O_3$, the temperature characteristics particularly under vacuum ultraviolet ray excitation were improved to a significant degree, and the rate of change of brightness under vacuum ultraviolet ray excitation was 1.5%. This was low enough to meet the detection limit of 2.5%, and the brightness distribution and the chromaticity distribution of CCFL were greatly improved, enabling to obtain a liquid crystal display device with excellent image quality. At the same time, brightness of 103% as CCFL was achieved when brightness of CCFL obtained in a comparative example 1 to be described later was taken as 100%. Furthermore, a red color having high calorimetric purity (CIE x,y=0.6678, 0.3293) could be obtained for the liquid crystal display device.

Example 3

Compared with the example 1, the present example differed in the kind of light source. Although CCFL was used in the example 1, EEFL shown in FIG. 13 was used in the present example. The phosphor utilized for EEFL was the same as that in the example 1. The production of EEFL differed in the formation of electrode portions compared with that of CCFL. In EEFL, a glass tube was coated with the phosphor, then one end of the glass tube was sealed, the tube was exhausted, and a discharge medium, mercury, was introduced, followed by sealing the other end of the glass tube. After that, flexible electrodes such as copper tape were arranged on the outer surface of the glass tube.

In such EEFL, a ballast condenser is not required because the glass tube itself serves as a condenser, which makes it possible to light up a plurality of lamps with a single inverter, that is, multi-lighting driving. This means that the number of inverters can be significantly reduced compared to CCFL, and therefore, a reduction in cost can be expected. Since many lamps are necessary for the back light unit 1 of the liquid crystal display device, the significant reduction in the number of inverters can contribute to not only economic effect but also downsizing of the device by decreasing the number of parts for the device.

In this EEFL, however, the glass tube itself served as a dielectric, resulting in higher amount of heat generated compared with CCFL. That is, temperature at the electrode portion rose significantly. Thus, EEFL tended to generate temperature distribution as well as brightness and chromaticity distributions due to the temperature characteristics of the phosphor compared with CCFL. The brightness and chromaticity distributions could be suppressed by utilizing the above red phosphor $(Y_{1-x-y},Gd_x,Eu_y)_2O_3$ improved in the temperature characteristics, and its suppression effect was greater compared with the case of CCFL.

The liquid crystal display panel 2 and the like were the same as in the example 1. The brightness distribution and the chromaticity distribution of EEFL were greatly improved in this example, and a liquid crystal display device with excellent image quality could be obtained.

Example 4

The present example differed in the kind of light source compared with the example 1. In the present example, the xenon lamp shown in FIG. 14 was used. The phosphor used for the xenon lamp was the same as in the example 1. The production of the xenon lamp differed in the formation of electrode portions and the kind of discharge medium compared with that of CCFL.

In the xenon lamp, a glass tube 11 was coated with the phosphor 12, then one electrode 13A was attached, and one end of the glass tube was sealed. From the side opposite to the sealed end, a discharge medium, xenon, was introduced, and the other end of the glass tube was sealed. After that, the other electrode 13B was arranged so as to wrap around the outer periphery of the glass tube. Discharge was generated by applying voltage between these electrodes 13A and 13B, and the resulting ultraviolet light (mainly vacuum ultraviolet ray) allowed the phosphor 12 to emit light.

Since the phosphor is excited by vacuum ultraviolet ray in such a xenon lamp, the brightness and chromaticity distributions due to the temperature characteristics of the phosphor easily occurs by being directly influenced by the temperature characteristics shown in FIG. 2. Thus, the brightness and chromaticity distributions could be suppressed by utilizing the above red phosphor $(Y_{1-x-y},Gd_x,Eu_y)_2O_3$ improved in the temperature characteristics, and its suppression effect was greater compared with the case of CCFL.

The liquid crystal display panel 2 and the like were the same as in the example 1. The brightness distribution and the chromaticity distribution of the xenon lamp were greatly improved in this example, and a liquid crystal display device with excellent image quality could be obtained.

Example 5

The present example differed in the kind of light source compared with the example 1. In the present example, a plane light source shown in FIG. 15 was utilized. Specifically, a plane xenon light source was utilized. The principle of light emission was the same as in the example 4, and the phosphor was excited by vacuum ultraviolet ray from xenon to emit light. Since light from the light source was surface emission, the diffuser plate 6 as in the example 1 is unnecessary, and the prism sheet 7 was placed directly on the light source and might be combined only with the liquid crystal display panel 2. Accordingly, the structure could be simplified and cost could be reduced compared with conventional one.

The surface area of the light source is wide in such a plane light source, and therefore, the temperature distribution also becomes large. Thus, the brightness distribution and the chromaticity distribution could be suppressed by making use of the above red phosphor $(Y_{1-x-y},Gd_x,Eu_y)_2O_3$ improved in the temperature characteristics, and its suppression effect was greater compared with the case of CCFL.

The liquid crystal display panel 2 and the like were the same as in the example 1. The brightness distribution and the chromaticity distribution of the plane xenon light source were greatly improved in this example, and a liquid crystal display device with excellent image quality could be obtained.

Example 6

The present example differed in the display mode of liquid crystal display panel that was used compared with the example 1. In the example 1, the IPS mode liquid crystal display panel was utilized, while a VA mode liquid crystal display panel was utilized in the present example. In conventional VA mode liquid crystal display devices, changes in chromaticity are markedly dependent on view angles. When a screen is viewed from the front, changes in chromaticity on both sides of the screen present a great problem. In comparison with the conventional VA mode liquid crystal display devices, the use of the present phosphor made it possible to suppress changes in brightness and chromaticity on both sides of the screen by suppressing the changes in the brightness and chromaticity of CCFL. Particularly, the change in chromaticity in the display on grey level could be suppressed.

Comparative Example 1

In order to compare with each of the above examples, the present comparative example was based on conventional technology and differed from the example 1 in using (Y,Eu)$_2O_3$ as the red phosphor. The detailed composition of the red phosphor was $(Y_{0.965},Eu_{0.035})_2O_3$.

The temperature characteristics of this phosphor were as shown in FIGS. 8 and 9. As shown in FIG. 8, the temperature characteristics under vacuum ultraviolet ray excitation were not good, and the brightness decreased remarkably as the temperature rose. The rate of change of brightness as shown in FIG. 3 was as large as 4% (Gd amount x=0). This value significantly exceeded the detection limit of 2.5%, and a liquid crystal display device using such a phosphor generated brightness and chromaticity distributions and did not provide a good liquid crystal display device. It should be noted that relative values of brightness in the above examples were shown by taking the brightness of CCFL obtained here as 100%. The liquid crystal display device had a red calorimetric purity of CIE x,y=0.6671, 0.3299.

What is claimed is:

1. A liquid crystal display device comprising:
    a white light source provided with a blue phosphor that emits blue light, a green phosphor that emits green light, and a red phosphor that emits red light; and
    a liquid crystal display panel having color filters to adjust the amount of transmitted light from the white light source for every pixel and transmit any one of blue, green, and red lights for every pixel,
    wherein the white light source includes an airtight tube provided with the blue phosphor, the green phosphor, and the red phosphor, electrodes arranged at respective ends of the airtight tube, and a discharge medium sealed in the airtight tube, and the airtight tube is a cylindrical glass tube having an inner diameter less than or equal to 10 mm,
    wherein, during operation of the white light source, the airtight tube has higher temperatures at its respective ends where the electrodes are arranged relative to a center portion of the airtight tube between the electrodes,
    wherein the white light source is disposed behind a back side of the liquid crystal display panel such that portions of the airtight tube are within an area defined by a periphery of the liquid crystal display panel, and
    wherein, in order to compensate for a brightness distribution of the white light source caused by a temperature dependence of the red phosphor on temperature variations of the airtight tube, the red phosphor is selected to be represented by a composition formula $(Y_{1-x-y}, Gd_x, Eu_y)_2O_3$ and the values of composition ratio, x and y, satisfy the conditions of $0.45 \leq x \leq 0.85$ and $0.025 \leq y \leq 0.040$, respectively.

2. The liquid crystal display device according to claim 1, wherein a crystal structure of the red phosphor is cubic.

3. The liquid crystal display device according to claim 1, wherein the red phosphor has a median particle diameter $d_{50}$ in the range of 2.0 μm to 6.0 μm.

4. The liquid crystal display device according to claim 1, wherein a main component of the discharge medium is mercury and the phosphors are excited by ultraviolet light radiated from the mercury to emit light.

5. The liquid crystal display device according to claim 1, wherein a main component of the discharge medium is xenon and the phosphors are excited by ultraviolet light radiated from the xenon to emit light.

6. The liquid crystal display device according to claim 1, wherein in addition to electrodes arranged at respective ends of the airtight tube, electrodes are also placed on an inside of the airtight tube.

7. The liquid crystal display device according to claim 1, wherein in addition to electrodes arranged at respective ends of the airtight tube, electrodes are also placed on an outer surface of the airtight tube.

8. The liquid crystal display device according to claim 1, wherein at least one of the electrodes arrange at an end of the airtight tube is also placed within the airtight tube and another electrode is placed on an outer surface of the airtight tube.

9. The liquid crystal display device according to claim 1, wherein the white light source is a cold cathode fluorescent lamp.

10. The liquid crystal display device according to claim 1, wherein the color filter to transmit the red light has a light transmittance equal to or lower than 50% in a light wavelength region lower than 600 nm.

11. The liquid crystal display device according to claim 1, wherein the liquid crystal display panel includes a pair of transparent substrates opposite to each other, alignment layers coated on the inner surfaces of the substrates, a layer of liquid crystal sandwiched between the alignment layers, and polarizing plates arranged on the outer surfaces of the of substrates, wherein the alignment layers are vertical alignment layers and the liquid crystal is aligned approximately vertically to the surfaces of the substrates when no voltage is applied and tilted against the surfaces of the substrates when voltage is applied, thereby adjusting the amount of transmitted light.

12. The liquid crystal display device according to claim 1, wherein length of the airtight tube takes values r such that 720 mm$\leq$r$\leq$1200 mm.

* * * * *